US012771682B2

(12) United States Patent
Barbir et al.

(10) Patent No.: US 12,771,682 B2
(45) Date of Patent: Oct. 20, 2026

(54) SYSTEMS AND METHODS FOR USER AUTHENTICATION USING SUBJECT IDENTIFIER AND/OR SUBJECT IDENTIFIER DOCUMENTS

(71) Applicant: Aetna Inc., Hartford, CT (US)

(72) Inventors: Abbie Barbir, Hartford, CT (US); Alan Bachmann, Hartford, CT (US); Erick Verry, Hartford, CT (US); Paul Ivanivsky, Hartford, CT (US); Cisa Kurian, Hartford, CT (US); Neal Shah, Hartford, CT (US); Michael Streuling, Hartford, CT (US)

(73) Assignee: Aetna Inc., Hartford, CT (US)

( * ) Notice: Subject to any disclaimer, the term of this patent is extended or adjusted under 35 U.S.C. 154(b) by 60 days.

(21) Appl. No.: 18/607,037

(22) Filed: Mar. 15, 2024

(65) Prior Publication Data

US 2025/0294019 A1 Sep. 18, 2025

(51) Int. Cl.
*H04L 9/40* (2022.01)

(52) U.S. Cl.
CPC .................................. *H04L 63/083* (2013.01)

(58) Field of Classification Search
CPC ...................................................... H04L 63/08
USPC ............................................................. 726/6
See application file for complete search history.

(56) References Cited

U.S. PATENT DOCUMENTS

| | | | | |
|---|---|---|---|---|
| 6,256,737 | B1 | 7/2001 | Bianco et al. | |
| 2001/0011274 | A1 | 8/2001 | Klug et al. | |
| 2011/0276627 | A1 | 11/2011 | Blechar et al. | |
| 2015/0127943 | A1 | 5/2015 | Luo et al. | |
| 2017/0222822 | A1 | 8/2017 | Lopez Quirarte | |
| 2018/0278612 | A1* | 9/2018 | Pattar | H04L 63/061 |
| 2020/0027091 | A1* | 1/2020 | Hassani | H04L 63/0807 |
| 2022/0345297 | A1 | 10/2022 | Barbir et al. | |
| 2025/0202882 | A1* | 6/2025 | Griffin-Allwood | H04L 63/0815 |

FOREIGN PATENT DOCUMENTS

| | | |
|---|---|---|
| CN | 110769001 B | 5/2022 |

* cited by examiner

*Primary Examiner* — Jahangir Kabir
(74) *Attorney, Agent, or Firm* — Leydig, Voit & Mayer, Ltd.

(57) ABSTRACT

In some instances, a method is provided. The method comprises: based on a content request for content from a user device associated with a user, generating a subject identifier for the user, wherein the subject identifier comprises a plurality of elements, wherein at least one of the plurality of elements comprises a subject identifier fragment indicating a unique identifier string for the user; based on generating the subject identifier for the user, providing, to the user device, a request to enroll in secure pass key (SPK) authentication; based on receiving user input indicating approval to enroll in the SPK authentication, generating a SPK for the user based on the subject identifier fragment from the subject identifier; and providing the SPK to the user device, wherein the user device accesses the requested content based on using the SPK.

20 Claims, 15 Drawing Sheets

300

300

400

420

```
{
  "@context": [
    "EXAMPLE URL 1",
    "EXAMPLE URL 2"
  ],
"id": "did:EXAMPLEDID:1Fe27eCztfr1HHytNW8SZkCgKJsEhWMMcF",
  "verificationMethod": [
    {
      "id": "#key1",
      "type": "EcdsaSecp256k1VerificationKey2019",
      "controller": "did:EXAMPLEDID:1Fe27eCztfr1HHytNW8SZkCgKJsEhWMMcF",
      "publicKeyBase58": "yourBase58PublicKeyHere"
    }
  ],
  "service": [
    {
      "id": "#payment",
      "type": "PaymentService",
      "serviceEndpoint": " EXAMPLE PAYMENT URL",
      "description": "A payment service for the EXAMPLEDID subject",
      "authentication": ["#key1"]
    }
  ]
}
```

452
454
456
458
460

450

FIG. 4C

SYSTEMS AND METHODS FOR USER AUTHENTICATION USING SUBJECT IDENTIFIER AND/OR SUBJECT IDENTIFIER DOCUMENTS

BACKGROUND

Relying parties may choose to use public/private key pairs as a way to enhance user protection to their resources. In this approach, the private key is bound to a specific user device and for a specific relying party domain. Therefore, each device may include a specific domain bound private key that is able to sign a challenge from the relying party to ensure that authentication is secure and immune from phishing attacks. Examples of such solutions include the original Fast Identity Online (FIDO) universal authentication framework (UAF) solution. An alternative to a device bound key is an approach that replicates and provides the initial private key to the cloud by either a platform provider or a PASSKEY provider. In this approach, the device bound key is validated on a cloud based on per key setup policies. This approach is less secure since it changes the device bound property of the key to a cloud bound approach. It also introduces the platform provider or the PASSKEY provider into the trust triangle by relying on their services for account recovery and key propagation to multiple devices. Further, this approach deprives the relying party from the right to control its own credential and for many regulated industries such as health-care and financial industries, it fails to meet the key possession requirement that is required for sensitive data. Accordingly, there remains a technical need to ensure that unauthorized and/or unknown devices are properly verified by the relying party prior to obtaining sensitive information of the user.

SUMMARY

In some examples, the present application provides a method and system for user authentication using subject identifiers (e.g., decentralized identifiers (DID)) and/or subject identifier documents (e.g., decentralized identifier documents (DDO)). For example, the enterprise organization may own, manage, operate, and/or be otherwise associated with an enterprise cloud computing system. The enterprise cloud computing system may include and/or be associated with an identity broker system and a wallet system (e.g., a database that stores credential information for a plurality of users). The cloud computing system (e.g., the identity broker system) may generate one or more subject identifiers for the user based on the user device consenting to the subject identifier enrollment (e.g., DID enrollment). The identity broker generates a unique subject identifier that includes a subject identifier fragment (e.g., a DID fragment) that uniquely identifies the user within a domain. The subject identifier fragment may be generated as a result of performing an identity validation step that may include the validation of the user using official documents. The identity broker uses the subject identifier fragment as a part of the subject identifier when identifying the user. The cloud computing system may further generate one or more subject identifier documents for the user and store the subject identifier documents into the wallet system. The subject identifiers may be resolved (e.g., by the identity broker system and/or another system/device) to determine a location of the subject identifier documents. The subject identifier documents may include, but are not limited to, information associated with the public/private key pair for one or more domains. For example, the enterprise organization may include internal application back-end systems that manage one or more internal domains (e.g., one or more software applications that are managed or owned by the enterprise organization). The subject identifier documents may include information associated with the public/private key pair for the one or more domains. Based on the subject identifier, the user device may determine the location of the subject identifier documents within the cloud computing system and may use this to access the private and/or public keys for the one or more internal domains. As such, using the subject identifier and the subject identifier documents that are managed by the enterprise cloud computing system and not the platform provider system, the user device may gain access to the content (e.g., sensitive information such as medical records of the user) for the internal domains (e.g., domains managed by the enterprise cloud computing system).

Additionally, and/or alternatively, the cloud computing system may use the subject identifiers for secure pass key authentication (e.g., secure pass token authentication) as well as for subject identifier authentication (e.g., DID authentication). For example, similar to the cryptography behind the public/private key pairs, a secure pass key (e.g., a secure pass token) is a credential (e.g., a FIDO credential) that does not require nor use a password. Instead, secure pass keys use an authentication method to identify and grant access to content for an authorized user. The secure pass key may be a cryptographically generated strong key that may be used as an alternative to user password. The key may be managed by platform provider on behalf of the user and the relying party, or it may be managed by a password manager on behalf of the user and the relying party. The relying party may also manage the secure pass key. In some examples, the secure pass key may be allowed to be stored in the cloud without identity binding (e.g., biometric authentication). In such examples, the secure pass key may be weaker than a device bound secure pass key since the cloud version represents a key that is held across many devices.

The secure pass keys may be shared (e.g., via BLUETOOTH and/or AIRDROP) from one device (e.g., an authorized device) to another device (e.g., an unauthorized device), and used by the other device to access content. However, as mentioned above, for certain enterprise organizations that are in possession of sensitive information of the user, this may be problematic as the enterprise organization might not be able to confirm the user's identity solely from the secure pass key authorization provided by the new device. As such, the enterprise cloud computing system may perform secure pass key authentication for the user using the subject identifier and the subject identifier authentication. For instance, the enterprise cloud computing system may generate a secure pass key using the subject identifier (e.g., a portion or a fragment of the subject identifier). The enterprise cloud computing system may then use the generated secure pass key for secure pass key authentication with its own internal applications as well as external applications.

Additionally, and/or alternatively, certain users may seek to not enroll into secure pass authentication. Instead, the subject identifier for a first domain may be used to grant access to content for a second, separate domain. For example, after enrolling into subject identifier enrollment/authentication, the enterprise cloud computing system may generate a first subject identifier, which includes a subject identifier fragment, for the first domain. Then, when the user seeks to access content on a second domain, the enterprise cloud computing system may determine that the user has enrolled into subject identifier authentication the first domain, and generate a second subject identifier for the second domain based on the first subject identifier. For example, the enterprise cloud computing system may generate a second subject identifier based on the subject identifier fragment from the first subject identifier, and may use the second subject identifier to grant the user access to the content on the second domain.

In one aspect, a system is provided. The system comprises: a back-end application system that is associated with a domain and is configured to: receive a content request for accessing content on the domain from a user device associated with a user; and based on the content request, provide an identification request to an identity broker system; the identity broker system, wherein the identity broker system is configured to: based on receiving the identification request, determine whether the user is enrolled in subject identifier authentication; based on determining that the user is not enrolled in the subject identifier authentication, generate a subject identifier for the user, wherein the subject identifier comprises a plurality of elements, wherein at least one of the plurality of elements comprises a subject identifier fragment, wherein the subject identifier fragment indicates a unique identifier string for the user; based on generating the subject identifier for the user, provide, to the user device, a request to enroll in secure pass key (SPK) authentication; based on receiving user input from the user device indicating approval to enroll in the SPK authentication, generate a SPK for the user based on the subject identifier fragment from the subject identifier; and provide the SPK to the user device and to a password manager system; and the password manager system, wherein the password manager system is configured to: store the SPK received from the identity broker system; receive the SPK from the user device; and grant access to the user device to content on the domain based on comparing the stored SPK with the received SPK.

Examples may include one of the following features, or any combination thereof. For instance, in some examples, the subject identifier is a decentralized identifier (DID), wherein the plurality of elements of the DID comprise a scheme element, a DID method element, and a namespace specific string, wherein a portion of the namespace specific string indicates the subject identifier fragment, and wherein the identity broker system is configured to generate the SPK for the user by: generating the SPK such that the subject identifier fragment indicated by the portion of the namespace specific string of the DID is the SPK.

In some instances, the content request indicates user information of the user and the identification request comprises the user information, and wherein the identity broker system is configured to determine whether the user is enrolled in the subject identifier authentication by: comparing the user information with stored information within a wallet system; and determining that the user is not enrolled in subject identifier authentication based on the comparison.

In some examples, the identity broker system is further configured to: subsequent to generating the subject identifier for the user, provide, to the user device, an identity request for use in identity binding; receive, from the user device, user authentication enrollment information indicating one or more biometric features of the user; and perform the identity binding for the user by binding the user authentication enrollment information with the generated subject identifier for the user, wherein providing the request to enroll in SPK authentication is based on performing the identity binding.

In some variations, the identity broker system is further configured to: provide, to the user device, a device request for use in device binding; receive, from the user device, device information associated with the user device; and perform the device binding for the user device by binding the device information with the generated subject identifier for the user and the user authentication enrollment information, wherein providing the request to enroll in SPK authentication is further based on performing the device binding.

In some instances, the identity broker system is further configured to: subsequent to generating the subject identifier for the user and based on receiving a second identification request from the back-end application system, determine whether the user is enrolled in the subject identifier authentication based on performing identity verification, and wherein providing the request to enroll in the SPK authentication is based on receiving the second identification request.

In some examples, the identity broker system is configured to determine whether the user is enrolled in the subject identifier authentication based on performing the identity verification by: comparing user information from the second identification request with stored user information within a wallet system; retrieving user authentication enrollment information that is linked to the stored user information within the wallet system; receiving authentication information from the user device; and comparing the authentication information with the user authentication enrollment information to determine that the user is enrolled in the subject identifier authentication.

In some variations, the user authentication enrollment information is further linked to the generated subject identifier within the wallet system, and wherein the identity broker system is configured to generate the SPK for the user by: retrieving the generated subject identifier that is linked to the user authentication enrollment information based on the comparison of the authentication information with the user authentication enrollment information; and generating the SPK for the user using the subject identifier fragment from the retrieved subject identifier.

In some instances, the identity broker system is further configured to: generate a subject identifier document associated with the subject identifier, wherein the subject identifier resolves to a storage location for the subject identifier document; generate a public and private key pair for the user, wherein the public key of the public and private key pair is included within the subject identifier document; and based on receiving the user input from the user device indicating approval to enroll in the SPK authentication, generating a pseudorandom function family (PRF) code based on the public key from the subject identifier document, wherein the password manager system is configured to grant access to the user device to the content on the domain based on the PRF code.

In some examples, the password manager system is further configured to: receive the SPK and the PRF code from the identity broker system; store the SPK and the PRF code in a wallet system; provide a SPK authentication request to the user device, wherein the SPK authentication request indicates a request to sign a challenge using the PRF code; and receive, from the user device, the signed challenge that was signed by the user device using the PRF code, wherein granting the access to the user device to the content on the domain is based on the signed challenge and comparing the stored PRF code in the wallet system with the received SPK from the user device.

In some variations, the identity broker system is configured to: receive a second identification request associated with a second content request for accessing the content on the domain; in response to receiving the second identification request, determine whether the user is enrolled in the subject identifier authentication by performing identity verification; and based on determining that the user is enrolled in the subject identifier authentication by performing the identity verification, determine whether a user device used for the second content request is enrolled in device verification, and wherein the user is granted access to the content on the domain based on whether the user device is enrolled in the device verification.

In some instances, the identity broker system is further configured to: based on determining that the user device that was used for the second content request is enrolled in the device verification, provide enrollment information indicating the enrollment of the user device; and wherein the password manager system is further configured to: receive, from the identity broker system, the enrollment information; based on the enrollment information, provide a SPK request to the user device; receive the SPK from the user device based on the SPK request; and provide an indication to grant access to the content in response to the second content request based on the received SPK from the user device.

In some examples, the identity broker system is further configured to: based on determining that the user device that was used for the second content request is not enrolled in the device verification, provide an identity verification request to the user device; receive authentication information from the user device based on the identity verification request; compare the authentication information with user authentication enrollment information stored in a wallet system, wherein the user authentication enrollment information is linked to the generated subject identifier; based on the comparison, link device information for the user device that was used for the second content request with the generated subject identifier; and provide, to the password manager system, information indicating the linking of the device information with the generated subject identifier, wherein the password manager system grants access to the content in response to the second content request based on the information indicating the linking.

In another aspect, a method is provided. The method comprises: based on a content request for content from a user device associated with a user, generating a subject identifier for the user, wherein the subject identifier comprises a plurality of elements, wherein at least one of the plurality of elements comprises a subject identifier fragment indicating a unique identifier string for the user; based on generating the subject identifier for the user, providing, to the user device, a request to enroll in secure pass key (SPK) authentication; based on receiving user input indicating approval to enroll in the SPK authentication, generating a SPK for the user based on the subject identifier fragment from the subject identifier; and providing the SPK to the user device, wherein the user device accesses the requested content based on using the SPK.

Examples may include one of the following features, or any combination thereof. For instance, in some examples, the subject identifier is a decentralized identifier (DID), wherein the plurality of elements of the DID comprise a scheme element, a DID method element, and a namespace specific string, wherein a portion of the namespace specific string indicates the subject identifier fragment, and wherein generating the SPK for the user comprises: generating the SPK such that the subject identifier fragment indicated by the portion of the namespace specific string of the DID is the SPK.

In some instances, the method further comprises: subsequent to generating the subject identifier for the user, providing, to the user device, an identity request for use in identity binding; receiving, from the user device, user authentication enrollment information indicating one or more biometric features of the user; and performing the identity binding for the user by binding the user authentication enrollment information with the generated subject identifier for the user, wherein providing the request to enroll in SPK authentication is based on performing the identity binding.

In some examples, the method further comprises: providing, to the user device, a device request for use in device binding; receiving, from the user device, device information associated with the user device; and performing the device binding for the user device by binding the device information with the generated subject identifier for the user and the user authentication enrollment information, wherein providing the request to enroll in SPK authentication is further based on performing the device binding.

In some variations, the method further comprises: generating a subject identifier document associated with the subject identifier, wherein the subject identifier resolves to a storage location for the subject identifier document; generating a public and private key pair for the user, wherein the public key of the public and private key pair is included within the subject identifier document; and based on receiving the user input from the user device indicating approval to enroll in the SPK authentication, generating a pseudorandom function family (PRF) code based on the public key from the subject identifier document, wherein the user device accesses the requested content based on using the SPK and the PRF code.

In yet another aspect, a non-transitory computer-readable medium having processor-executable instructions stored thereon is provided. The processor-executable instructions, when executed by one or more processors, facilitate: based on a content request for content from a user device associated with a user, generating a subject identifier for the user, wherein the subject identifier comprises a plurality of elements, wherein at least one of the plurality of elements comprises a subject identifier fragment indicating a unique identifier string for the user; based on generating the subject identifier for the user, providing, to the user device, a request to enroll in secure pass key (SPK) authentication; based on receiving user input indicating approval to enroll in the SPK authentication, generating a SPK for the user based on the subject identifier fragment from the subject identifier; and providing the SPK to the user device, wherein the user device accesses the requested content based on using the SPK.

In some examples, the subject identifier is a decentralized identifier (DID), wherein the plurality of elements of the DID comprise a scheme element, a DID method element, and a namespace specific string, wherein a portion of the namespace specific string indicates the subject identifier fragment, and wherein generating the SPK for the user comprises: generating the SPK such that the subject identifier fragment indicated by the portion of the namespace specific string of the DID is the SPK.

All examples and features mentioned herein may be combined in any technically possible way.

BRIEF DESCRIPTION OF THE DRAWINGS

The subject technology will be described in even greater detail below based on the exemplary figures but is not limited to the examples. All features described and/or illustrated herein can be used alone or combined in different combinations. The features and advantages of various examples will become apparent by reading the following detailed description with reference to the attached drawings which illustrate the following:

FIGS. 4A-4C show an exemplary subject identifier, an exemplary decentralized identifier, and an exemplary subject identifier document in accordance with one or more examples of the present application.

DETAILED DESCRIPTION

Figure 1:
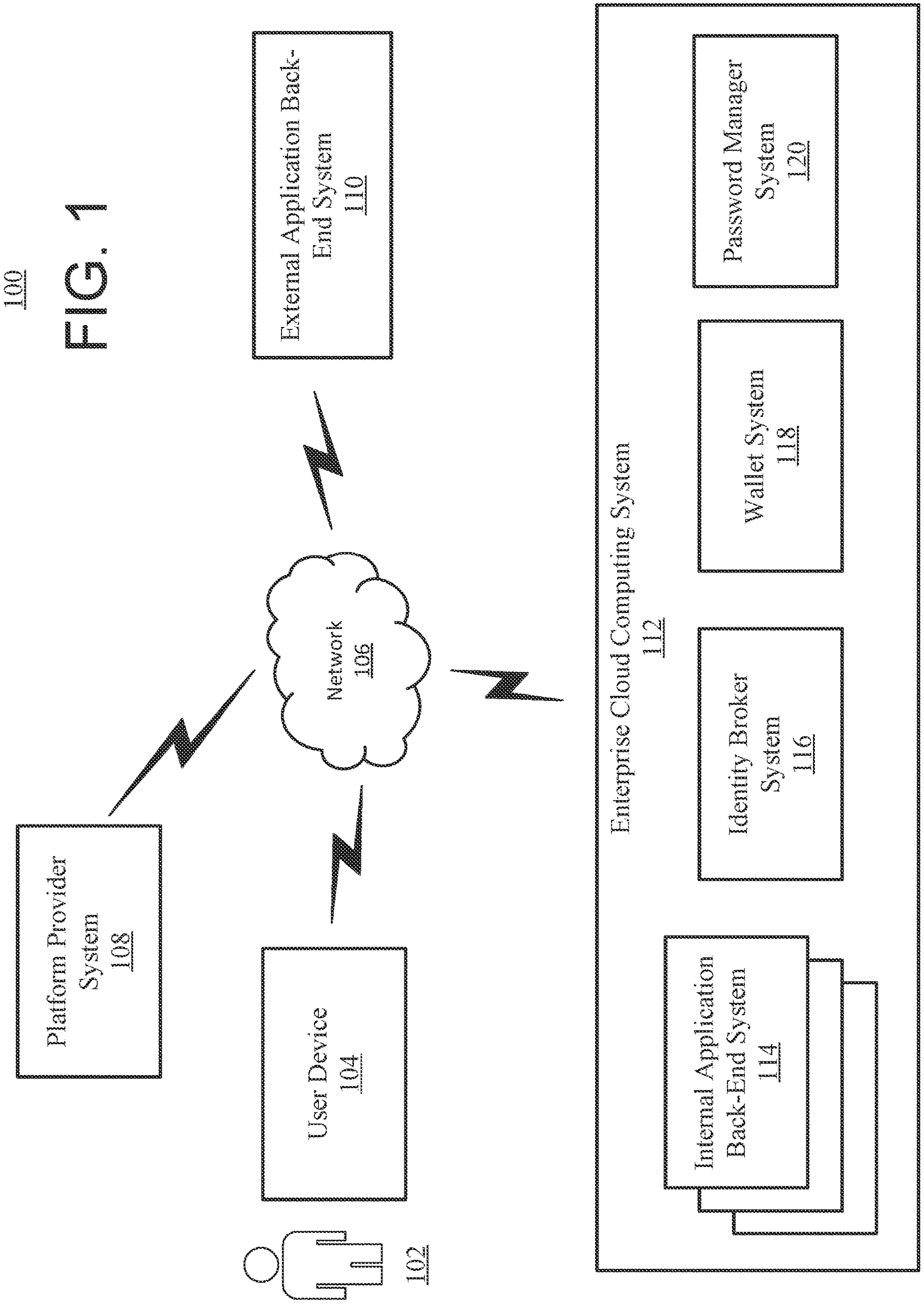
FIG. 1 is a simplified block diagram depicting an exemplary computing environment in accordance with one or more examples of the present application.

Examples of the presented application will now be described more fully hereinafter with reference to the accompanying FIGs., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

As mentioned above, architectures (e.g., FIDO architectures) previously included public and private key pairs that were associated with particular domains (e.g., one or more relying party domains) and bound to a specific user device. For example, for each domain (e.g., a domain indicating and/or associated with a uniform resource locator and/or application), a different public/private key pair may be used by the user device to access content on the associated domain. As such, a digital wallet for the user may store and oversee numerous different public/private key pairs for the user. In another iteration of the architecture, the public/private key pairs are not stored on the user device itself anymore. Instead, a platform provider (e.g., the platform provider such as a cloud computing environment that is associated with an operating system) stores and maintains the different public/private key pairs for the user and may further maintain PASSKEYS for the user. Accordingly, the user may use multiple different user devices that are linked to the platform provider to access their public/private key pairs as well as PASSKEYS, and thus access content on the different domains.

However, the PASSKEY usage deprives the relying party from the right to control its own credential and for many regulated industries such as healthcare and financial industries, it fails to meet the certain requirements that are required for sensitive data. A second problem with the current PASSKEY usage is that they rely on an account rather than on an identity verification. For example, an email used to operate an ANDROID device may be used without the need for full identity enrolment. So, when this email is used as the anchor of trust to distribute PASSKEYS, then a relying party may have no real assurance that the same user is accessing their services. For example when a second ANDROID device is used, it may also have the same PASSKEY since it was shared between devices, and the relying party may have no real assurances that the same user is using this second device. As such, this may cause accounts to become vulnerable to hackers attempting access to the service while using new devices with new email accounts on those devices.

To solve these issues, the methods and systems presented herein describe using an identity binding layer (e.g., an identity broker system) as the main layer that spawns secure pass keys and other password management solutions. This top layer is independent from the platform provider and the password manager layer and is under the control of the relying party or its trusted partners. The new layer described herein binds user identity to an identifier that is then used to establish an identifier (e.g., subject identifier), which is further used by secure pass key or password providers. In some examples, the methods and systems described herein establishes a secure pass key that is identity bound to an individual and may be validated in order to restore access to the user account.

Additionally, and/or alternatively, the methods and systems presented herein describe generating multiple subject identifiers (e.g., DIDs) using a subject identifier fragment. For example, the enterprise cloud computing system may generate a first subject identifier, including a subject identifier fragment, for a first domain. The enterprise cloud computing system may generate one or more subject identifiers for one or more other domains based on the subject identifier fragment for the first domain. The enterprise cloud computing system may use the one or more subject identifiers to access content on the other domains.

Using a generated subject identifier, systems, methods, and computer program products are herein disclosed that provide for subject identifier authentication, secure pass key (SPK) authentication for a user, and single sign-on using a subject identifier fragment from the generated subject identifier. FIG. 1 is a simplified block diagram depicting an exemplary environment in accordance with an example of the present application. The environment 100 includes a user 102, a user device 104 (e.g., a computing device), a network 106, a platform provider system 108, an external application back-end system 110, and an enterprise cloud computing system 112. The enterprise cloud computing system 112 includes one or more internal application back-end systems 114, an identity broker system 116, a wallet system 118, and a password manager system 120. Although the entities within environment 100 may be described below and/or depicted in the FIGs. as being singular entities, it will be appreciated that the entities and functionalities discussed herein may be implemented by and/or include one or more entities. For instance, the enterprise cloud computing system 112 may include a plurality of computing devices, systems, platforms, and/or servers that are spread across multiple different geographical locations and communicate with each other using direct connections and/or the network 106.

The entities within the environment 100 such as the user device 104, the platform provider system 108, the external application back-end system 110, and/or the enterprise cloud computing system 112 may be in communication with other devices and/or systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100.

User 102 may operate, own, and/or otherwise be associated with the user device 104. For instance, the user 102 may seek to access content (e.g., sensitive information such as medical records and/or financial information) from one or more different domains. The domain may be, include, and/or is associated with a uniform resource locator (URL), a webpage, an application, an application programming interface (API), and/or another content source or entity that is hosted by one or more servers, computing platforms, and/or computing systems. For example, a first server (e.g., an internal application back-end system 114 and/or an external application back-end system 110) may manage, host, and/or otherwise be associated with a first domain (e.g., a first software application). A second server may manage, host, and/or otherwise be associated with a second domain (e.g., a second software application). The user 102 may use the user device 104 to access content on the first domain and/or the second domain.

The user device 104 is and/or includes, but is not limited to, a desktop, laptop, tablet, mobile device (e.g., smartphone device, or other mobile device), smart watch, an internet of things (IOT) device, or any other type of computing device that generally comprises one or more communication components, one or more processing components, and one or more memory components. The user device 104 may be able to execute software applications and/or programs. Additionally, and/or alternatively, the user device 104 may be configured to operate a web browser to connect to a web page (e.g., a first domain name associated with a first domain) and/or an application hosted and/or managed by the internal application back-end systems 114 and/or the external application back-end systems 110. For instance, the user 102 may use the user device 104 to request access to content on a web page and/or provide user credentials to gain access to the content from the web page (e.g., ordering groceries or accessing medical records for the user 102).

The platform provider system 108 assists the user device 104 in accessing content on multiple different domain names. For example, the platform provider system 108 may be a system that is associated with a platform provider such as a platform provider that is associated with one or more operating systems (e.g., operating systems of one or more smart phones or devices such as the ANDROID operating system or the APPLE IOS operating system). For instance, the platform provider system 108 may be a cloud computing environment that stores information for the user 102 such as log-in information for the user 102. The platform provider system 108 includes and/or is implemented using one or more computing devices, computing platforms, cloud computing platforms, systems, servers, and/or other apparatuses.

The external application back-end system 110 is a computing system that hosts, operates, manages, and/or is otherwise associated with one or more domains (e.g., one or more web pages, applications and/or other programs associated with domains). The external application back-end system 110 includes and/or is implemented using one or more computing devices, computing platforms, cloud computing platforms, systems, servers, and/or other apparatuses capable of hosting and/or managing the domains. Further, the external application back-end system 110 may authenticate a user's credentials to permit the user to access content on a domain. In some variations, the content may be stored on the external application back-end system 110. In other variations, the content may be stored on a different server and/or system that is associated with the external application back-end system 110. In such variations, the external application back-end system 110 may be used to authenticate the user and permit the user to access content on the domain. The external application back-end system 110 may further direct the user device 104 to access the content on a separate server and/or system.

The enterprise cloud computing system 112 is a cloud computing system that includes and/or is implemented using one or more computing devices, computing platforms, cloud computing platforms, systems, servers, and/or other apparatuses capable of hosting and/or managing domains as well as generating and using subject identifiers and/or subject identifier documents for subject identifier authentication, SPK authentication, and/or other authentication processes. An enterprise organization may own, manage, and/or be otherwise associated with the enterprise cloud computing system 112. In some examples, the enterprise cloud computing system 112 may be owned, operated, and/or managed by a first enterprise organization and the external application back-end system 110 may be owned, operated, and/or managed by a second enterprise organization that is different from the first enterprise organization. The enterprise organizations may be any type of corporation, company, organization, and/or other institution that provides one or more goods and/or services. For instance, the first enterprise organization may provide multiple different services such as a grocery pick-up service, a prescription pick-up service (e.g., the enterprise organization may provide prescriptions/medications to the user 102), an insurance service (e.g., the enterprise organization may provide insurance to the user 102), a streaming service (e.g., the enterprise organization may provide for streaming videos, television shows, and so on to the user 102), a medical records service (e.g., the enterprise organization may provide medical records for the user 102 to review), a financial service, and/or other services.

The enterprise cloud computing system 112 includes one or more internal application back-end systems 114. The one or more internal application back-end systems 114 operate, manage, and/or otherwise are associated with one or more domains (e.g., one or more web pages, applications and/or other programs associated with domains). Each of the internal application back-end systems 114 includes and/or is implemented using one or more computing devices, computing platforms, cloud computing platforms, systems, servers, and/or other apparatuses capable of hosting and/or managing the domains. Further, the internal application back-end systems 114 may authenticate a user's credentials to permit the user to access content on a domain. In some variations, the content may be stored on the internal application back-end systems 114. In other variations, the content may be stored on a different server and/or system that is associated with the internal application back-end systems 114. In such variations, the internal application back-end systems 114 may be used to authenticate the user and permit the user to access content on the domain. The internal application back-end systems 114 may further direct the user device 104 to access the content on a separate server and/or system.

The enterprise cloud computing system 112 further includes an identity broker system 116 that performs subject identifier authentication (e.g., DID authentication) and SPK authentication for one or more users. Additionally, and/or alternatively, the identity broker system 116 may perform single sign-on (SSO) using a subject identifier that was generated from subject identifier authentication. The user 102 may access content on the internal application back-end systems 114 and/or the external application back-end system 110 based on the subject identifier authentication and/or the SPK authentication. For example, the identity broker system 116 generates subject identifiers (e.g., DIDs) and/or subject identifier documents (e.g., DDOs) for one or more users. The subject identifiers may include one or more portions or fragments. For instance, in some examples, the subject identifiers may include a scheme, a namespace, and a namespace specific string. The subject identifier documents may be documents, files, and/or other data structures that include information associated with the user. For instance, the subject identifier documents may include context information (e.g., context and standards that are used in the document), an identifier field indicating a unique identifier for the user such as the subject identifier, a verification method array that includes public and/or private keys associated with one or more domains, an authentication array that indicates that the public and/or private keys are authorized for authentication with one or more arrays, a service array that describes service endpoints, and/or additional information.

The subject identifier may resolve to a location associated with the subject identifier document. For example, after generation, the identity broker system 116 may generate the subject identifiers and the subject identifier documents, and store them in a wallet system 118 (e.g., a wallet database and/or repositories that is within the cloud computing system 112 and/or managed by the enterprise organization). As such, the identity broker system 116 may store the subject identifier document into a particular storage location within the wallet system 116. Using the subject identifier, the identity broker system 116 (and/or the user device 104) may resolve the subject identifier. For example, the identity broker system 116 may convert the subject identifier into another format (e.g., a hypertext transfer protocol (HTTP)), and use the converted subject identifier to determine the storage location of the subject identifier document. In some examples, the subject identifier may be a DID. The DID may include three elements. The first element is an identifier scheme, which may be "DID". The second element is a DID method such as "web" (e.g., HTTP format). The third element is a unique string (e.g., DID method specific string) that is associated with or indicates the user 102. Based on the first and second elements, the identity broker system 116 may resolve (e.g., convert) the portions of the DID into another format that is usable to determine the storage location of the DDO. For instance, based on the first element indicating "DID" and the second element indicating "web", the identity broker system 116 may convert (e.g., transform) at least a portion of the third element (e.g., the unique string) into an HTTP link that points to the location of the DDO. The identity broker system 116 may use the HTTP link to obtain information (e.g., private/public key pair information) from the DDO.

The subject identifier may include any number of elements indicating different information, and may be resolved in numerous different methods, algorithms, means, and/or approaches to determine the location of a subject identifier document (e.g., a physical storage location of the subject identifier document). For instance, in the example above, the subject identifier is a DID that indicates a DID method of "web" for resolving the DID. In other instances, the subject identifier and/or the DID may indicate another method for resolving the subject identifier and/or the DID. The identity broker system 116 may resolve the subject identifier and/or the DID based on the other method indicated by the subject identifier and/or the DID. For instance, the DID may indicate BITCOIN as the DID method, and the identity broker system 116 may resolve the DID based on a BITCOIN method to determine a physical storage location of the DDO.

Based on resolving the subject identifier, the identity broker system 116 may then retrieve the subject identifier document and/or information stored within the subject identifier document (e.g., the public and/or private key pairs), and use them for subject identifier authentication and/or SPK authentication. In some instances, the identity broker system 116 may provide the subject identifier to the user device 104. The user device 104 may use the subject identifier to resolve the storage location of the subject identifier document within the wallet system 118.

In some variations, the identity broker system 116 may perform subject identifier authentication and/or SPK authentication. For subject identifier authentication, the identity broker system 116 may request the user 102 to enroll into subject identifier authentication (e.g., DID authentication). Based on the user device 104 indicating approval for enrolling into the subject identifier authentication, the identity broker system 116 generates the subject identifier, the subject identifier document, and one or more public and/or private key pairs (e.g., a public/private key pair for a first application that is hosted by one of the internal application back-end systems 114 and/or the external application back-end system 110). The identity broker system 116 may include the public and/or private key pairs into the subject identifier document, and store the subject identifier and the subject identifier document into the wallet system 118. In some variations, the identity broker system 116 may store only the public key from the public/private key pair into the subject identifier document (e.g., DDO). The identity broker system 116 may store the private key in another location within the enterprise cloud computing system 112 (e.g., in a storage location within the wallet system 118 that is separate from the subject identifier document). Additionally, and/or alternatively, the identity broker system 116 may provide the private key to the user device 104. The user device 104 may store the private key within its own memory and/or within the platform provider system 108.

In some examples, the identity broker system 116 may further request user authentication enrollment information, which may be used later to verify the identity of the user 102. The user authentication enrollment information may be any information that may be used by an entity (e.g., the identity broker system 116 and/or the password manager system 120) to confirm the identity of the user 102. For instance, the user authentication enrollment information may include biometric information (e.g., a fingerprint, voice print, facial scan, and/or other biometric features of the user 102). Additionally, and/or alternatively, the user authentication enrollment information may include platform provider information such as a platform provider system 108 that the user 102 is associated with and/or device information (e.g., an identification feature of the user device 104). For instance, based on the device information, during authentication, the identity broker system 116 may provide a quick response (QR) code to the user device 104. The user device 104 and/or another device may provide a response to the QR code (e.g., a scan of the QR code), which may allow the user 102 access to the content. The identity broker system 116 may store the user authentication enrollment information into the wallet system 118.

Based on receiving a request to access content, the identity broker system 116 may perform subject identifier authentication, and request authentication information from the user 102. In some variations, the user device 104 may provide the authentication information such as recently obtained biometric information of the user 102. The identity broker system 116 may compare the authentication information with the stored user authentication enrollment information to verify the user 102. Based on the verification, the identity broker system 116 may retrieve the subject identifier and use the subject identifier to resolve a storage location of the subject identifier document. The identity broker system 116 may obtain the public and/or private keys from the subject identifier document and use the public and/or private keys to grant access to the content on a back-end application system (e.g., the internal and/or external back-end application systems 110 and/or 114). For instance, the identity broker system 116 may authenticate a challenge (e.g., a DDO challenge) with the back-end application system using the public and/or private keys. The back-end application system may grant access to the requested content based on authenticating the challenge. For instance, the back-end application system may provide a prompt indicating that the user device 104 has been granted access to the domain (e.g., application) associated with the back-end application system, and the user device 104 may access the requested content.

Additionally, and/or alternatively, the identity broker system 116 may perform SPK authentication. For example, similar to a public/private key pair, the SPK may be a password less authenticator that is used to authenticate a user 102 and/or a user device 104. However, whereas a private key of the public/private key pair may be stored in a single location (e.g., stored at the user device 104, the platform provider system 108, and/or the wallet system 118), the SPK may be provided to numerous different entities or devices. For instance, the user device 104 may obtain the SPK, but may forward the SPK to another entity (e.g., via BLUETOOTH, AIRDROP, near field communication (NFC) process, and/or another communication method). The other entity may use the SPK to grant access to content to a system (e.g., back-end application systems 110 and/or 114). As such, the user device 104 may share their SPK to trusted entities. However, while the user 102 may trust the trusted entities, due to other factors, the enterprise cloud computing platform 112 might not be able to completely trust those entities to share sensitive information of the user 102 (e.g., medical records of the user 102). As such, after performing the subject identifier authentication, the identity broker system 116 may generate a SPK based on the subject identifier and provide the SPK to the user device 104. For example, based on the user device 104 indicating approval to perform SPK authentication, the identity broker system 116 may generate a SPK for the user 102. The SPK may be tied to the enterprise organization associated with the enterprise cloud computing system 112, and may be used to access applications and/or other content that is managed, hosted, and/or operated by the enterprise organization as well as applications and/or other content that is managed, hosted, and/or operated by other enterprise organizations (e.g., by a second enterprise organization that is associated with the external back-end application system 110). For instance, in addition to using the SPK to gain access to content for internal applications, the enterprise cloud computing system 112 may manage SPK authentication and enrollment for other applications that are managed by other enterprise organizations. For example, one or more additional enterprise organizations may enroll into and/or subscribe to the SPK authentication that is managed by the enterprise cloud computing system 112. Based on the enrollment, the external application back-end systems (e.g., the external application back-end system 110) may use the SPK generated by the enterprise cloud computing system 112 to grant access to the user 102. The SPK authentication and the subject identifier authentication will be described in further detail below.

Additionally, and/or alternatively, in some examples, the user 102 may seek to not enroll into SPK authentication, but may still seek to enroll into single sign-on. As such, based on enrolling into subject identifier authentication for a first domain, the identity broker system 116 may generate a first subject identifier for the first domain. As mentioned above, the subject identifier may include a plurality of elements. The elements may indicate a subject identifier fragment that uniquely identifies the user 102. When seeking to access content on a second, separate domain, the identity broker system 116 may generate a second subject identifier for the second domain based on the subject identifier fragment for the first subject identifier. The identity broker system 116 may then grant the user 102 access to content on the second domain using the second subject identifier for the second domain.

The identity broker system 116 and/or the wallet system 118 include and/or are implemented using one or more computing devices, computing platforms, databases, repositories, cloud computing platforms, systems, servers, and/or other apparatuses. The wallet system 118 includes and/or is implemented using one or more computing devices, computing platforms, databases, cloud computing platforms, systems, servers, and/or other apparatuses.

The password manager system 120 is a computing system that assists in performing SPK authentication for the user 102. For example, the password manager system 120 may obtain the SPK from the identity broker system 116 and store the SPK in a secure location (e.g., a secure database such as a secure network location managed by the enterprise organization). In some examples, the secure location may be in the wallet system 118 and/or a secure portion of the wallet system 118. In some variations, the password manager system 120 may use one or more encryption techniques on the SPK to generate an encrypted SPK. The password manager system 120 may store the encrypted SPK in the secure location. During the validation phase, the password manager system 120 may receive the SPK from the user device 104 and/or the identity broker system 116. The password manager system 120 may compare the SPK with the SPK stored in the secure location. Additionally, and/or alternatively, the password manager system 120 may perform the same encryption technique to encrypt the received SPK, and compare the encrypted SPK with the encrypted SPK in the secure location. Based on the comparison, the password manager system 120 may determine whether the user device 104 is able to access the requested content.

The password manager system 120 includes and/or is implemented using one or more computing devices, computing platforms, databases, cloud computing platforms, systems, servers, and/or other apparatuses. In some instances, the password manager system 120 may be a computing entity that is separate from the enterprise cloud computing system 112. The identity broker system 116, the wallet system 118, and the password manager system 120 will be described in further detail below.

In some examples, the enterprise cloud computing system 112, the entities within the enterprise cloud computing system 112 (e.g., the identity broker system 116) and/or other entities within the environment 100 may be implemented as engines, software functions, and/or applications. In other words, the functionalities of the enterprise cloud computing system 112, the entities within the enterprise cloud computing system 112 and/or other entities within the environment 100 may be implemented as software instructions stored in storage (e.g., memory) and executed by one or more processors.

It will be appreciated that the exemplary environment depicted in FIG. 1 is merely an example, and that the principles discussed herein may also be applicable to other situations—for example, including other types of institutions, organizations, devices, systems, and network configurations. For instance, in some variations, the functionalities of the enterprise cloud computing system 112 may be separated into multiple different entities.

Figure 2:
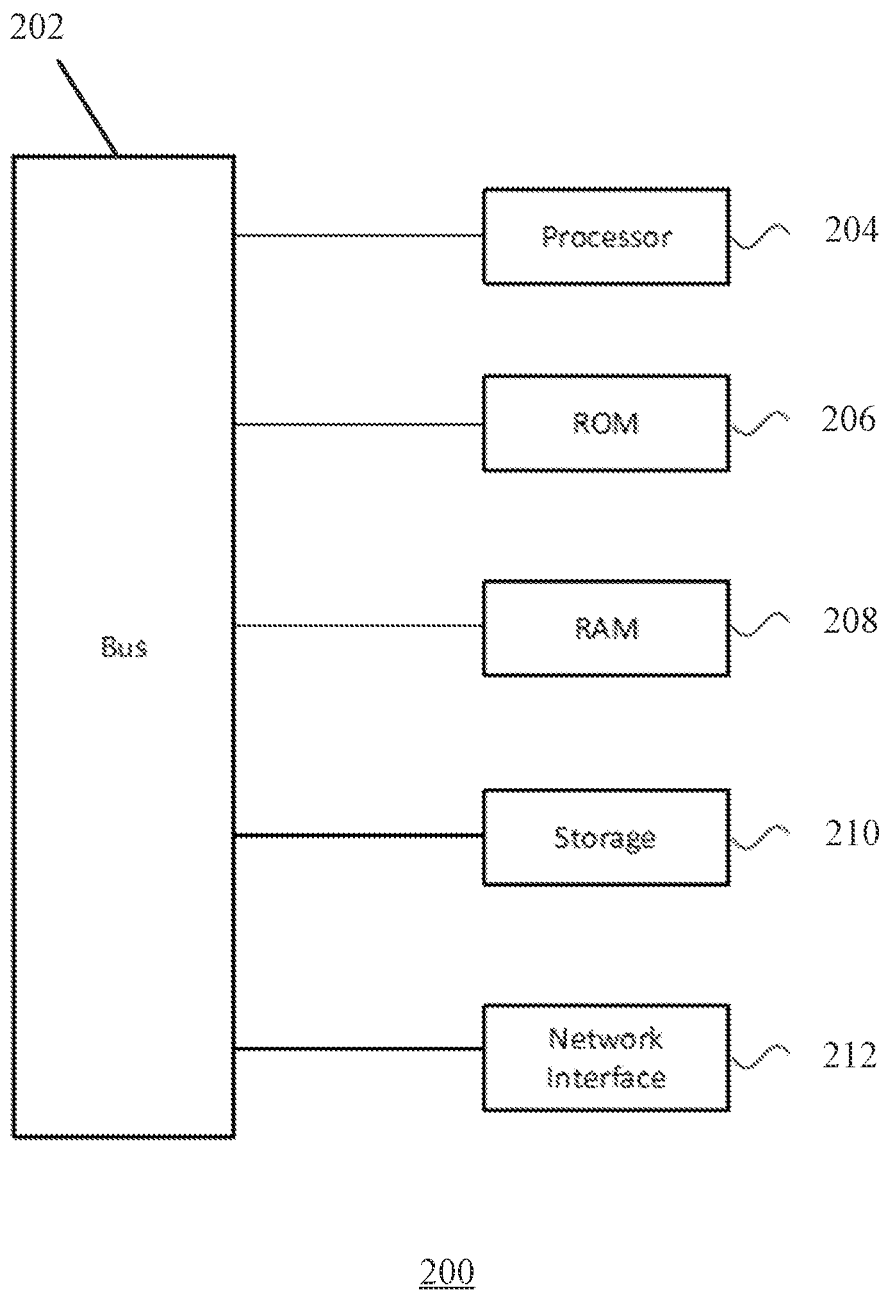
FIG. 2 is a simplified block diagram of one or more devices or systems within the exemplary environment of FIG. 1.

FIG. 2 is a block diagram of an exemplary system and/or device 200 within the environment 100. The device/system 200 includes one or more processors 204, such as one or more central processing units (CPUs), controller, and/or logic, that executes computer executable instructions for performing the functions, processes, and/or methods described herein. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 106. The device/system 200 may also include a bus 202 that connects the processor 204, ROM 206, RAM 208, storage 210, and/or the network interface 212. The components within the device/system 200 may use the bus 202 to communicate with each other. The components within the device/system 200 are merely exemplary and might not be inclusive of every component, server, device, computing platform, and/or computing apparatus within the device/system 200. Additionally, and/or alternatively, the device/system 200 may further include components that might not be included within every entity of environment 100.

Figure 3A:
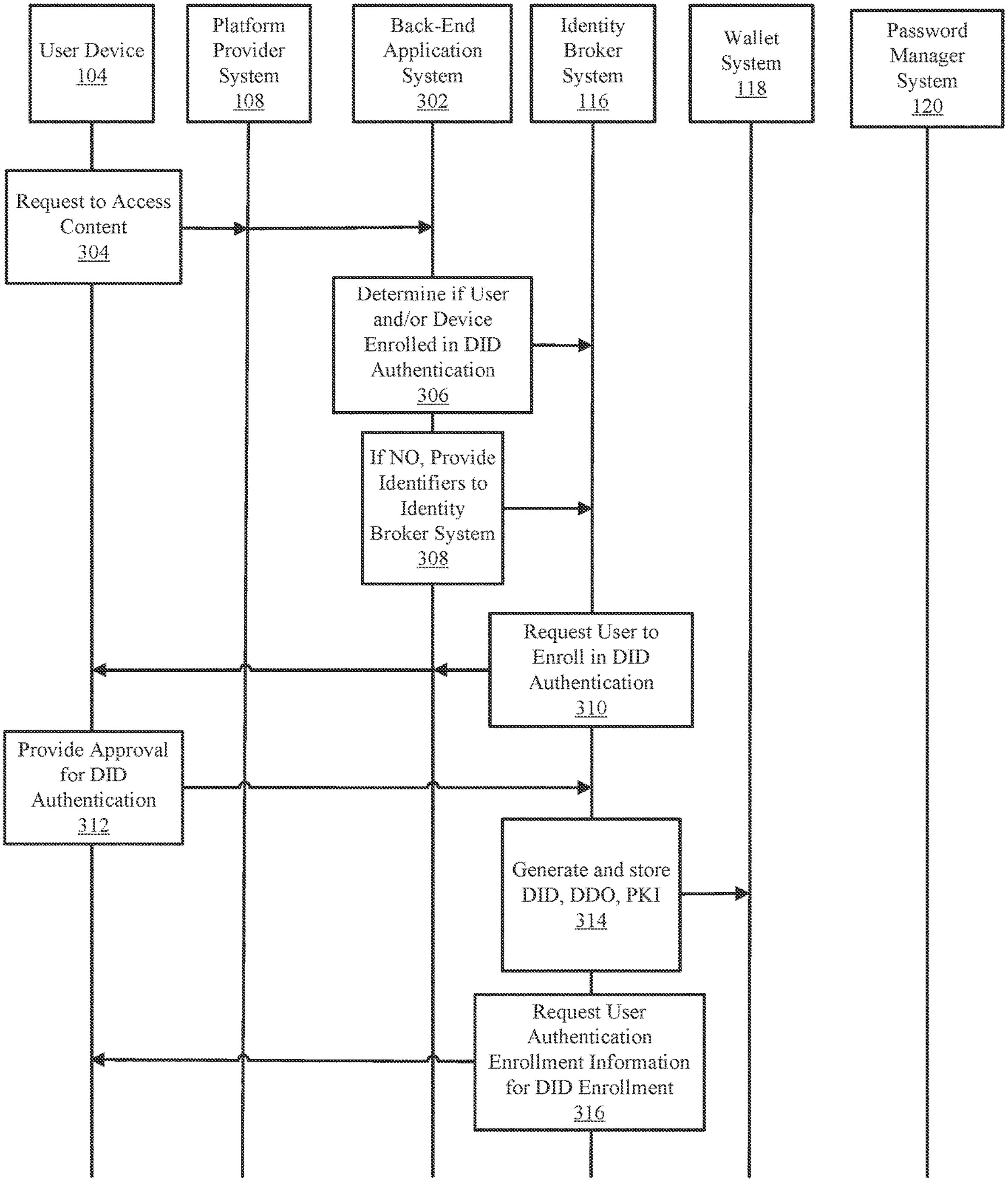
FIGS. 3A-3C show an exemplary event sequence for subject identifier authentication and secure pass key authentication in accordance with one or more examples of the present application.
Figure 3B:
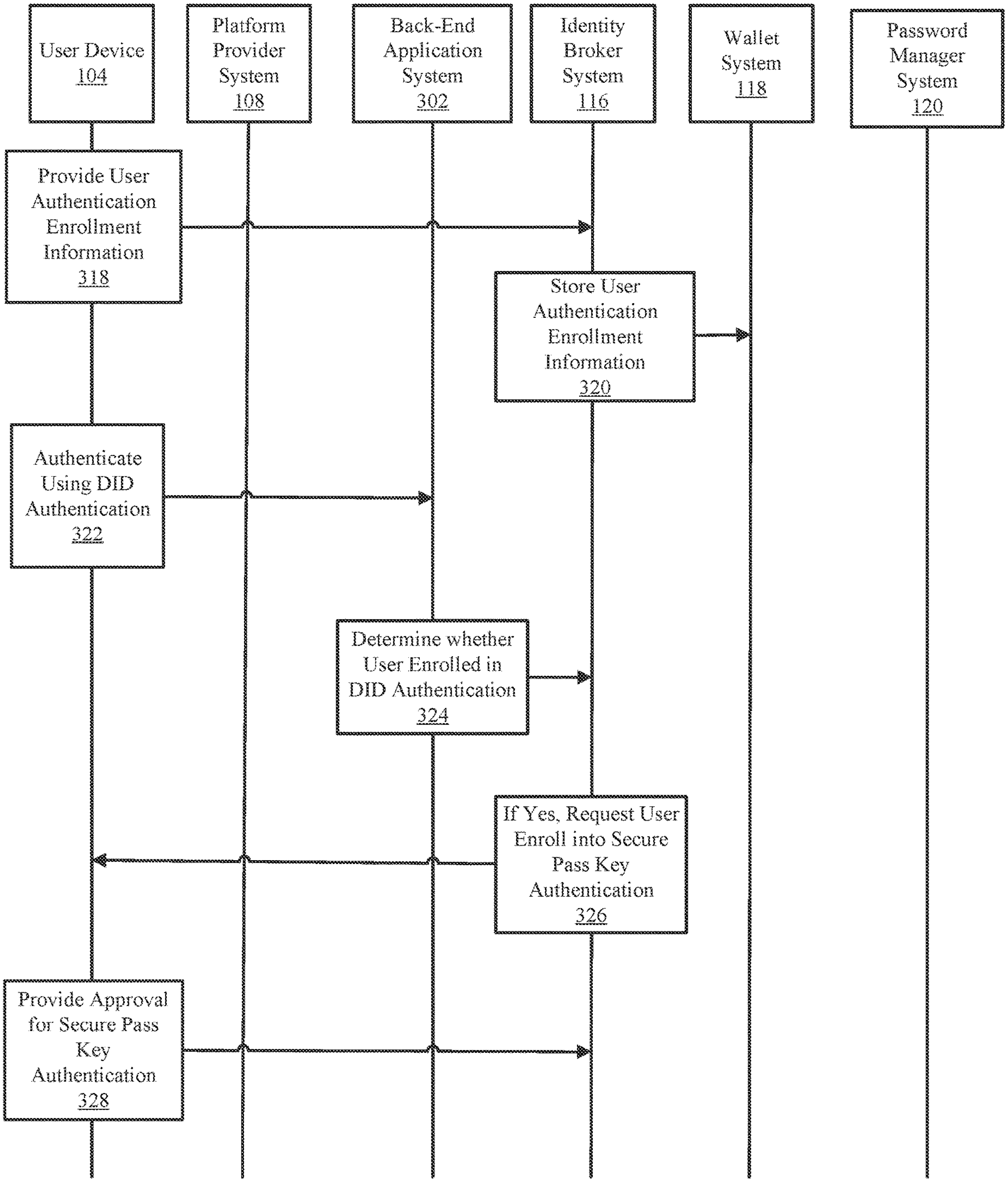
Figure 3C:
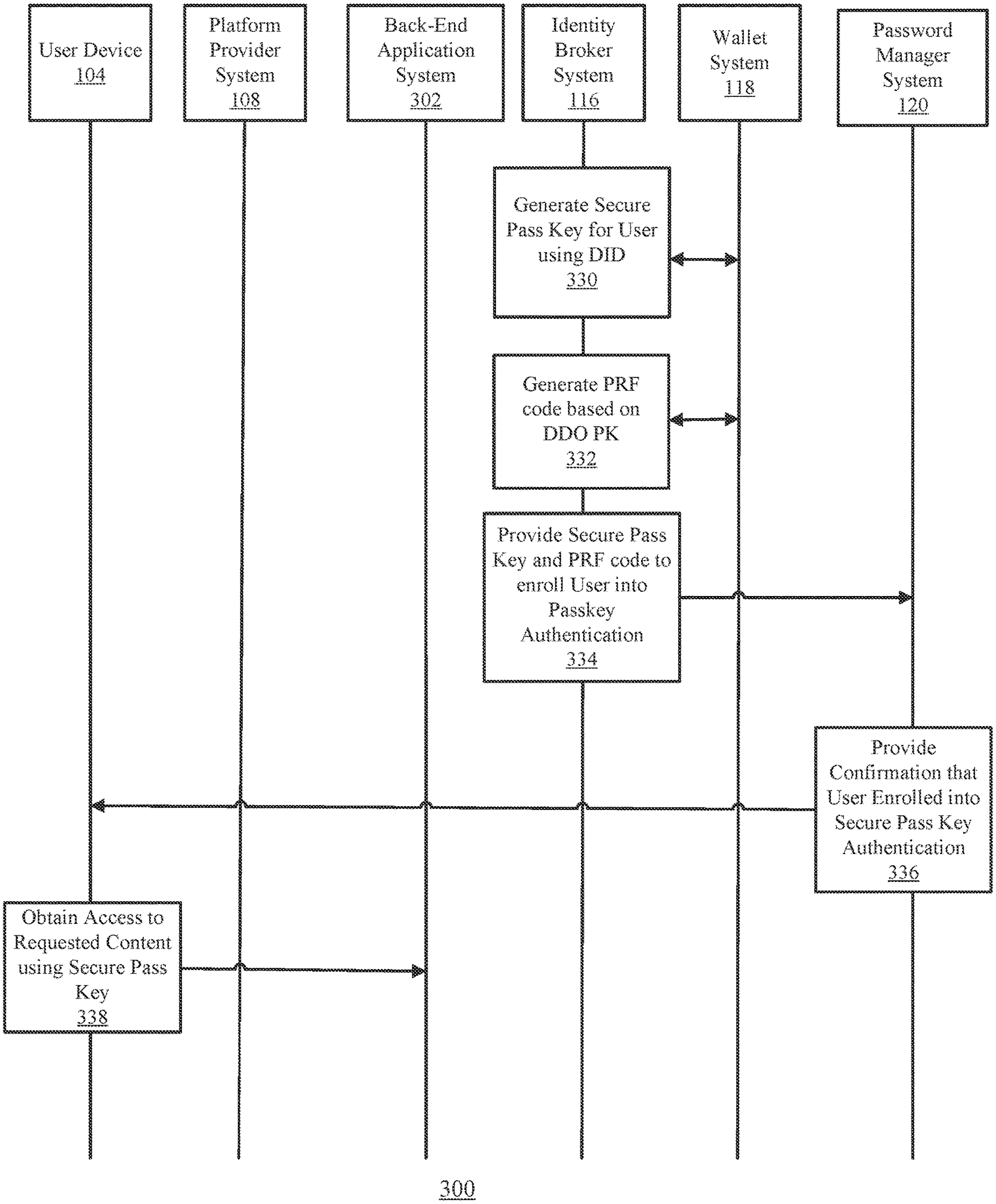

FIGS. 3A-3C show an exemplary event sequence for subject identifier authentication and SPK authentication in accordance with one or more examples of the present application. However, the event sequence 300 is merely an example and other types of event sequences are contemplated herein including by performing any of the following blocks in any suitable order. The event sequence 300 includes operations, processes, and/or functions that are performed by one or more entities within the environment 100. For example, the event sequence 300 includes blocks performed by the user device 104, the platform provider system 108, a back-end application system 302 (e.g., one of the internal application back-end systems 114 and/or the external application back-end system 110), the identity broker system 116, the wallet system 118, and the password manager system 120.

As will be described below, the event sequence 300 uses a DID as the subject identifier and a DDO as the subject identifier document. However, the DID and the DDO are merely exemplary subject identifiers and subject identifier documents. In other examples of using event sequence 300, the entities within the environment 100 and shown in FIGS. 3A-3C may use other types or examples of subject identifiers and/or subject identifier documents.

Referring to FIG. 3A, at block 304, the user device 104 provides a request to access content associated with the back-end application system 302. For instance, the user 102 may seek to access content on a first domain (e.g., a domain associated with a software application that provides one or more services to the user 102). The back-end application system 302 may facilitate the verification and/or authorization of the user 102 in accessing the content on the first domain. For example, the back-end application system 302 may own, manage, operate, and/or be otherwise associated with the first domain that the user 102 is seeking access to. In some examples, as mentioned previously, the back-end application system 302 may store the content that the user 102 is requesting. In other examples, the back-end application system 302 may perform a verification process to ensure the user 102 is authorized to access the content, and may then grant access to the content that is stored in a separate entity (e.g., in a separate server).

The back-end application system 302 may be one of the internal application back-end systems 114 or the external application back-end system 110. For instance, as mentioned previously, the enterprise organization (e.g., a first enterprise organization) that owns, manages, and/or operates the enterprise cloud computing system 112 may further provide one or more services (e.g., storing medical records for the user 102 and/or a drug prescription pick-up service). The internal application back-end systems 114 may facilitate the access to content that allows the user 102 to access the services. For example, the internal application back-end systems 114 may operate a domain (e.g., a software application) that provides the services to the user 102. The applications that are managed/operated by the internal application back-end systems 114 are internal applications.

Additionally, and/or alternatively, other enterprise organizations may seek to use the authentication and verification methods (e.g., subject identifier authentication and/or SPK authentication) provided by the enterprise cloud computing system 112. As such, a second enterprise organization that provides other services may enroll into and/or subscribe to the authentication and verification methods provided by the enterprise cloud computing system 112. These services may be hosted or managed by the external application back-end system 110.

In other words, the user device 104 may provide a request to access content that is managed by either the internal application back-end systems 114 (e.g., internal applications) or the external application back-end system 110 (e.g., external applications). For example, using the user device 104, the user 102 may provide a request to the platform provider system 108. The request may include and/or indicate user information (e.g., log-on information such as a user identifier and/or a user password). The platform provider system 108 may provide the request and/or the user information to the back-end application system 302.

At block 306, the back-end application system 302 determines if the user 102 and/or the user device 104 is enrolled in DID authentication. For example, as mentioned previously, the enterprise cloud computing platform 112 may provide subject identifier authentication (e.g., DID authentication) and/or SPK authentication. For determining whether the user 102 is enrolled in the subject identifier/DID authentication, the back-end application system 302 may provide a request (e.g., an identification request) or prompt to the identity broker system 116 to check whether a subject identifier (e.g., DID) associated with the user 102 and/or a subject identifier document (DDO) associated with the user 102 is stored in the wallet system 118. The identity broker system 116 may receive the request and/or prompt, check with the wallet system 118, and provide an indication indicating whether the user 102 is enrolled in the subject identifier/DID authentication. For example, the request from the user device 104 may indicate user information associated with the user 102 such as a username that indicates the user 102 and/or other identifying information associated with the user 102. The identity broker system 116 may compare the username and/or other identifying information associated with the user 102 with information stored in the wallet system 118. Based on the comparison, the identity broker system 116 may determine whether the user 102 and/or the user device 104 is enrolled in DID authentication.

At block 308, if no, the back-end application system 302 provides identifiers (e.g., application identifiers and/or user identifiers) to the identity broker system 116. For example, as mentioned previously, the back-end application system 302 may obtain user identifiers (e.g., a username and/or user information) from the user device 104. Further, the back-end application system 302 may be associated with an application identifier that identifies an application (e.g., domain) that is managed, hosted, operated, and/or otherwise associated with the back-end application system 302. The back-end application system 302 provides the obtained identifiers to the identity broker system 116. In some instances, the user identifiers may be provided to the identity broker system 116 at block 306, and at block 308, the back-end application system 302 solely provide the application identifiers to the identity broker system 116 at block 308.

At block 310, based on receiving the identifiers, the identity broker system 116 provides a prompt that requests the user 102 to enroll in DID authentication. For example, the identity broker system 116 may provide the prompt to the back-end application system 302, and the back-end application system 302 may forward the request to the user device 104. Additionally, and/or alternatively, the identity broker system 116 may provide the prompt directly to the user device 104 and/or the platform provider system 108.

At block 312, the user device 104 provides approval for the DID authentication. For example, at block 310, the identity broker system 116 may provide a prompt (e.g., instructions) that causes display of a display on the user device 104. The user 102 may provide user input indicating approval of the DID authentication. The user device 104 may provide the approval to the back-end application system 302, which then provides the approval to the identity broker system 116. Additionally, and/or alternatively, the user device 104 may provide the approval directly to the identity broker system 116.

Figure 4A:
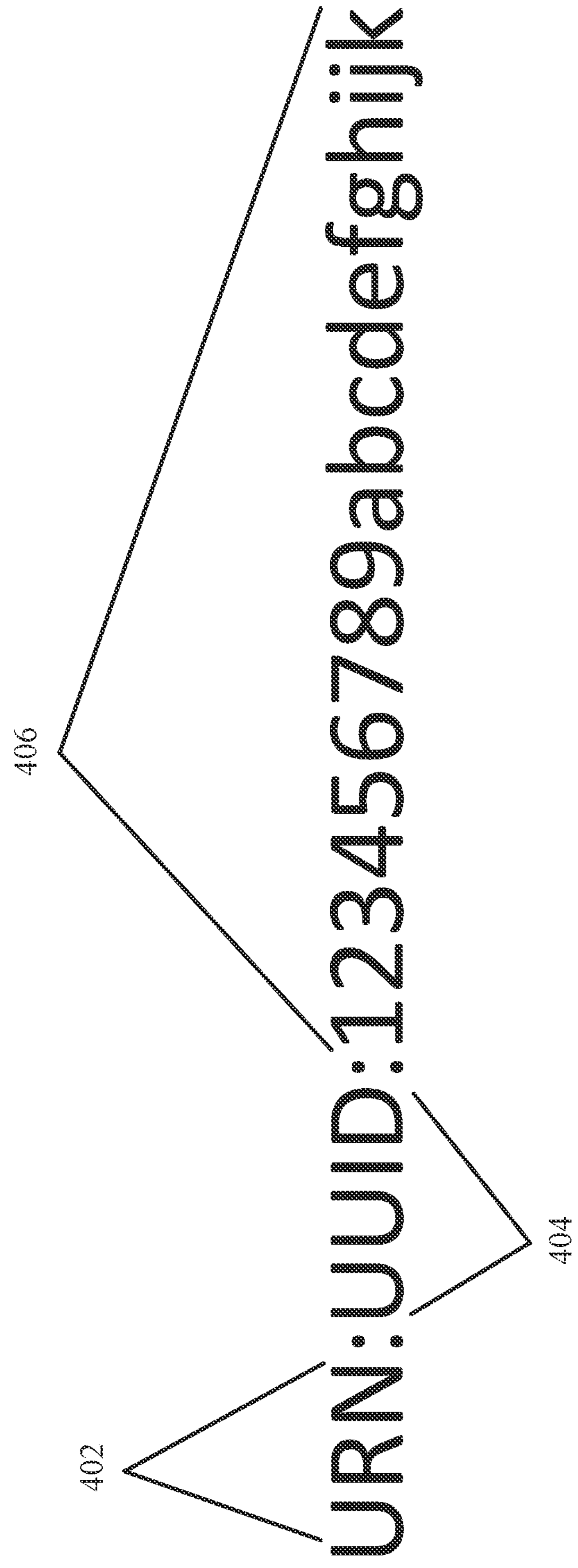
Figure 4B:
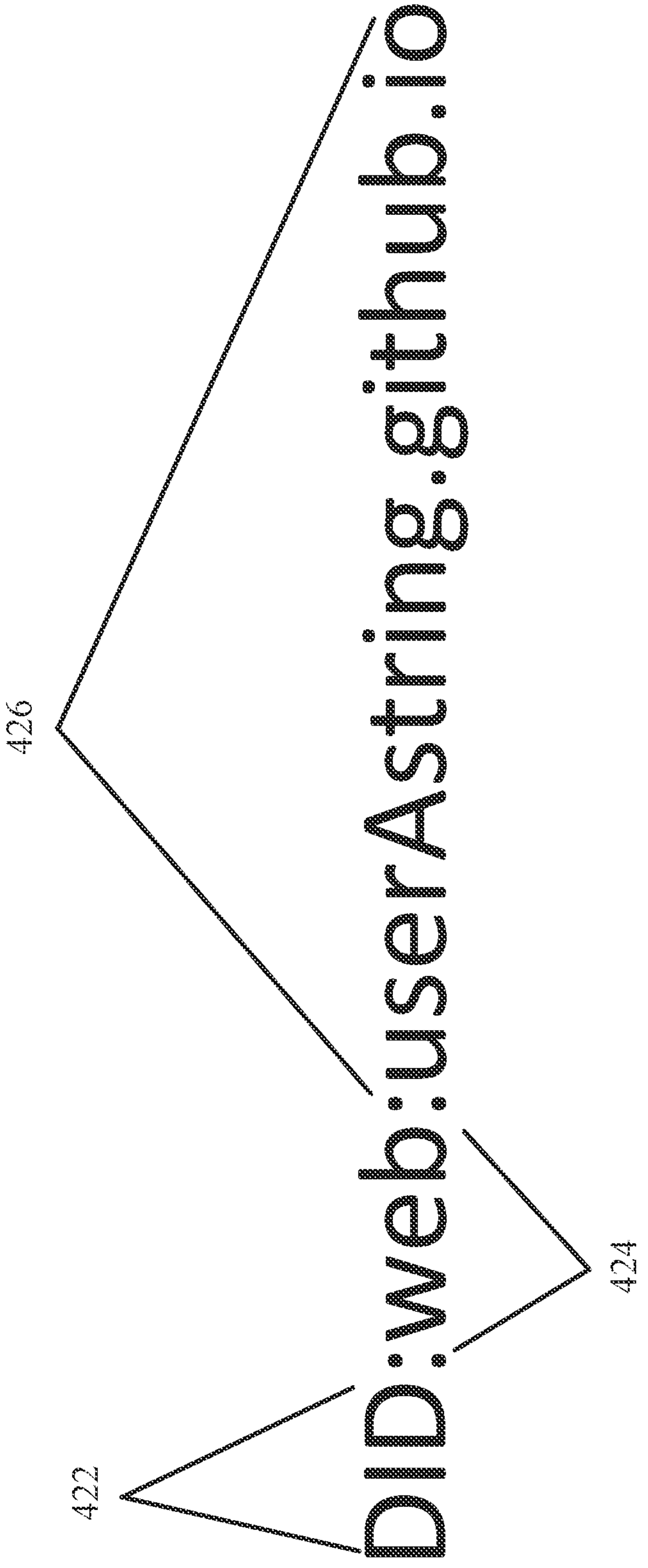

At block 314, based on the approval from the user device 104, the identity broker system 116 generates and stores a DID, DDO, and/or public key infrastructure (PKI) for the user 102. The DID, DDO, and/or the private/public keys from the PKI may be associated with a first domain (e.g., the domain hosted by the back-end application system 302). For example, as mentioned previously, the identity broker system 116 may generate a DID, and the DID may indicate a scheme (e.g., "DID"), a DID method such as "web", and a namespace specific string (e.g., a specific string associated with the user 102). FIGS. 4A and 4B show two exemplary subject identifiers in accordance with one or more examples of the present application. For example, FIG. 4A shows a first subject identifier 400 and FIG. 4B shows a DID 420. For example, referring to FIG. 4A, the subject identifier 400 includes three elements 402-406. The first element 402 shows a scheme such as a uniform resource name (URN). The second element 404 shows a namespace such as universal unique identifier (UUID). The third element 406 shows a namespace specific string (e.g., "123456789abcdefghijkl"). Similarly, referring to FIG. 4B, the DID 420 also includes the three elements 422-426. The first element 422 shows the scheme such as DID. The second element 424 shows the method such as "web". The third element 426 shows the specific string, which also identifies the user 102 (e.g., "userAstring.github.io"). As such, the subject identifier may include any number of elements that include different information. For instance, in FIG. 4A, the subject identifier 400 includes the UUID for the user 102 as element 404. The subject identifier 420 (e.g., the DID 420) includes the specific string that identifies the user 102 as part of the third element 426. The subject identifier fragment (e.g., the DID fragment), which may be used to generate the SPK, generate one or more additional DIDs for one or more additional domains, and/or be resolved to determine the subject identifier document (e.g., DDO), may be any portion of the subject identifier. For example, referring to FIG. 4A, the subject identifier fragment may be the second element 404. In FIG. 4B, the subject identifier fragment may be a part of the third element 426.

As mentioned previously, the identity broker system 116 may resolve the subject identifier and/or DID to determine a storage location that stores the subject identifier document and/or the DDO. For instance, by using the first and second elements 422/424 of the DID 420 of FIG. 4B, the identity broker system 116 may determine a conversion format to use (e.g., an HTTP format or link based on the DID method 424 indicating "web"). Then, using the third element 426 (e.g., "userAstring" from element 426), the identity broker system 116 may generate an indicator that indicates a storage location of the subject identifier document and/or the DDO. For example, based on the DID method indicating "web", the identity broker system 116 may generate an HTTP link using the third element 426 (e.g., "userAstring.github.io"), and the HTTP link may point to a storage location of a JAVASCRIPT OBJECT NOTATION (JSON), which may be the subject identifier document/DDO.

In addition, the identity broker system 116 may generate one or more private/public key pairs for the user 102 and/or the user device 104. For example, based on the approval from the user device 104, the identity broker system 116 may generate one or more private/public key pairs for the domain associated with the back-end application system 302. The private/public key pairs may be used to authenticate the user 102 and/or the user device 104 and gain access the content associated with the back-end application system 302. The identity broker system 116 may generate the private/public key pairs using one or more cryptography algorithms.

The identity broker system 116 may further generate the DDOs and store the generated one or more private and/or public key pairs into the DDOs. The DDO may indicate context information (e.g., context and standards that are used in the document), an identifier field indicating a unique identifier for the user such as the subject identifier, a verification method array that includes public keys associated with one or more domains, an authentication array that indicates that the public keys are authorized for authentication with one or more arrays, a service array that describes service endpoints, and/or additional information.

FIG. 4C shows an exemplary DDO 450 in accordance with one or more examples of the present application. For instance, the DDO 450 includes elements 452-460. Element 452 indicates a context array that specifies the context and standards used in the DDO 450. Element 454 indicates an identifier field indicating the unique identifier for the DID (e.g., the DID for the DDO 450 is "did:EXAMPLEDID: 1Fe27eCztfr1HHytNW8SZkCgKJsEhWMMcF"). Element 456 indicates a verification method array that includes a public key with an identifier of "#key1", which is associated with the owner or controller of the DID (e.g., the user 1020. For example, the element 456 may include the generated public key for the back-end application system 302. The element 458 is a service array that describes a service endpoint (e.g., a payment service, an identifier for the service, a type of the service, a service endpoint, a description of the service, and so on). Further, the service array 458 includes an authentication array or element 460 that indicates that the key with the identifier "#key1" is authorized for authentication.

After generating the DID, DDO, and PKI (e.g., the private and public key pairs), the identity broker system 116 stores the DID, DDO, and the PKI in the wallet system 118. In some examples, as mentioned above, the identity broker system 116 only stores the public key in the DDO. The identity broker system 116 may store the private key in another location within the enterprise cloud computing system 112 (e.g., another location within the wallet system 118). Additionally, and/or alternatively, the identity broker system 116 may provide the private key back to the user device 104. The user device 104 may store the private key in its own memory or within the platform provider system 108. In other examples, the identity broker system 116 may store the private key within the DDO itself.

At block 316, the identity broker system 116 requests user authentication enrollment information for the DID enrollment. For example, the identity broker system 116 may provide a request for the user authentication information (e.g., biometric features of the user 102) to the user device 104.

Referring to FIG. 3B, at block 318, the user device 104 provides the user authentication enrollment information. For example, the user device 104 may obtain the user authentication enrollment information (e.g., biometric features of the user 102 such as a fingerprint, voice print, and/or facial scan), and provide the user authentication enrollment information to the identity broker system 116.

At block 320, the identity broker system 116 stores the user authentication enrollment information into the wallet system 118. The user authentication enrollment information may be used to validate and/or authenticate the user 102 and/or the user device 104 at a later time. As such, in some instances, the identity broker system 116 may store and link information for the user 102 and/or the user device 104 within the wallet system 118. The linked and stored information may include the DID, the DDO, the private/public keys, the user authentication enrollment information, user identification information (e.g., the username and/or password), and/or the application identifier that was provided in block 308. Additionally, and/or alternatively, the identity broker system 116 may further link (e.g., associate) the above information (e.g., the DID, the DDO, the private/public keys, and so on) with device information. For example, at block 318, in addition to providing the user authentication enrollment information, the user device 104 may further provide device information such as a device identifier, a device fingerprint, and/or other information that is associated with the user device 104. The identity broker system 116 may store and link the device information with the above information. Thus, by storing and linking the user identification information with the above information (e.g., the DID, DDO, private/public keys, the device information, and so on), the identity broker system 116 performs identity binding. By storing and linking the device information with the above information e.g., the DID, DDO, private/public keys, the user identification information, and so on), the identity broker system 116 performs device binding.

In some variations, blocks 316 through 320 are optional. For example, the identity broker system 116 may use other methods, processes, and/or algorithms to verify the user 102 and/or the user device 104. For instance, instead of using biometric information, the identity broker system 116 may provide a QR code to the user device 104 and/or another device to verify the user 102. The identity broker system 116 may use the results from the QR code (e.g., a scan of the QR code from the user device 104 and/or a separate device) to verify the user 102. As such, in such situations, the blocks 316 through 320 might not be needed and the identity broker system 116 may use other verification methods to verify and/or authenticate the user 102 and/or the user device 104. Additionally, and/or alternatively, the identity broker system 116 may use an indicator from the platform provider system 108. For example, the platform provider system 108 may have authenticated the user 102 through one or more methods, processes, and/or algorithms. As such, the platform provider system 108 may provide authentication information indicating the authorization of the user 102. For certain non-sensitive situations (e.g., a grocery pick-up service associated with the back-end application system 302), the identity broker system 116 may authorize or verify the user 102 and/or the user device 104 based on the authentication information from the platform provider system 108.

At block 322, the user device 104 authenticates the user 102 using the DID authentication. For example, after enrolling the user 102 into DID authentication (e.g., performing blocks 310, 312, 314, 316, 318, and/or 320), the back-end application system 302 may direct the user 102 to perform DID authentication. The user device 104 may receive the prompt and begin authenticating the user 102 using the DID authentication.

For example, when performing blocks 316 through 320, the user device 104 may obtain authentication information such as biometric information (e.g., biometric features). For instance, the user device 104 may obtain the biometric information such as a new fingerprint, voiceprint, and/or facial scan, and provide the biometric information to the back-end application system 302. When not performing blocks 316 through 320, the user device 104 may provide a prompt to the platform provider system 108, and request the platform provider system 108 may provide authentication information indicating the authorization of the user 102. Additionally, and/or alternatively, the user device 104 may request that the back-end application system 302 provides a QR code for the user device 104 and/or another device to scan.

At block 324, the back-end application system 302 may determine whether the user 102 enrolled in DID authentication. Initially, the back-end application system 302 may perform block 324 similar to performing block 306 above. For instance, the back-end application system 302 may provide a request (e.g., an identification request) to the identity broker system 116, and the identity broker system 116 may compare the username and/or other identifying information associated with the user 102 with information stored in the wallet system 118. Based on the comparison, the identity broker system 116 may determine whether the user 102 and/or the user device 104 is enrolled in DID authentication. For example, after performing the DID authentication (e.g., blocks 310, 312, 314, 316, 318, and/or 320 above), the identity broker system 116 may generate a DID and/or DDO for the user 102. Within the wallet system 118, the DID and/or DDO may be linked to the username and/or other identifying information associated with the user 102. Thus, based on the request from the back-end application system 302, the identity broker system 116 may determine that the user 102 is enrolled into DID authentication. In addition, the identity broker system 116 may further perform identity verification using the authentication information. The identity verification may indicate whether the DID and the DDO is identity bound (e.g., linked) to the user authentication enrollment information. Below describes the identity broker system 116 performing the identity verification using the authentication information.

For example, for the biometric information, the back-end application system 302 provides the biometric information to the identity broker system 116. The identity broker system 116 compares the biometric information with the stored biometric information (e.g., from the user authentication enrollment information). Based on the comparison, the identity broker system 116 may determine whether the user 102 and/or the user device 104 is enrolled in DID authentication (e.g., the biometric features from block 324 matching the biometric features from the user authentication enrollment information may indicate that the user 102 is enrolled in DID authentication).

For the QR code, the back-end application system 302 and/or the identity broker system 116 may provide the QR code to the user device 104 and/or another device associated with the user 102. The back-end application system 302 and/or the identity broker system 116 may receive the scanned QR code back from the user device 104 and/or the other device. Based on the received QR code, the identity broker system 116 may determine that the user 102 and/or the user device 104 is enrolled in DID authentication.

For the platform provider system 108 providing authentication information indicating the authorization of the user 102, the back-end application system 302 and/or the identity broker system 116 may provide a request to the platform provider system 108. The platform provider system 108 may provide the authentication information in response to the request.

Additionally, and/or alternatively, the back-end application system 302 may provide a request to the identity broker system 116 indicating for the identity broker system 116 to confirm whether the user 102 enrolled in DID authentication by performing a DDO challenge. For instance, subsequent to performing identity verification and/or as an alternative to performing identity verification, the identity broker system 116 may perform a DDO challenge. For example, based on the authentication information (e.g., the biometric features of the user 102 matching the stored biometric features within the wallet system 118), the identity broker system 116 may retrieve the DDO associated with the user 102 from the wallet system 118. The identity broker system 116 may generate and provide a challenge to the user device 104. The user device 104 may sign the challenge using its private key (e.g., the private key that was generated in block 314). In some instances, the identity broker system 116 may provide the private key to the user device 104 itself. To sign the challenge, the user device 104 may retrieve the private key from its memory and sign the challenge using the retrieved private key. In other instances, the private key may be stored in a separate location. The user device 104 may retrieve the private key from the separate location such as the platform provider system 108 and/or the wallet system 118 (e.g., by performing identity verification with the identity broker system 116). After retrieving the private key, the user device 104 may sign the challenge using the private key. The user device 104 may provide the signed challenge to the identity broker system 116. The identity broker system 116 may authenticate the challenge using the public key from the DDO. For example, the identity broker system 116 may decrypt the signed challenge from the user device 104 with the public key from the DDO. Based on the decryption, the identity broker system 116 may determine whether the user device 104 is authenticated. Subsequently, based on the authentication and performing the DDO challenge, the identity broker system 116 may determine that the user 102 and/or the user device 104 is enrolled into DID authentication. In some instances, the identity broker system 116 may provide this indication to the back-end application system 302.

In some examples, blocks 322 and 324 are optional. For example, based on enrolling the user 102 into DID authentication using blocks 308-320 within the same session, the identity broker system 116 may determine that the user 102 and/or the user device 104 is enrolled in DID authentication without using blocks 322 and 324. As such, the identity broker system 116 may proceed directly to block 328. In other examples, such as when the enrolling of the user 102 into DID authentication is performed in a separate session and/or for extra security during the same session, blocks 322 and 324 are performed. For example, for the separate session, after block 320, the back-end application system 302 may grant access to the content requested by the user device 104. Then, in a subsequent session and based on a subsequent request for content, the back-end application system 302 and the identity broker system 116 may perform blocks 322 and 324.

At block 326, based on verifying the authentication of the user 102 using DID authentication, the identity broker system 116 may provide a request to the user 102 and/or the user device 104 indicating whether they would like to enroll into SPK authentication. As mentioned previously, SPK authentication may use a SPK as an authenticator to authenticate the user 102 and/or the user device 104.

At block 328, the user device 104 provides approval for SPK authentication. For example, similar to blocks 310 and 312, the identity broker system 116 may provide a prompt (e.g., instructions) that causes display of a display on the user device 104. The user 102 may provide user input indicating approval to enroll into the SPK authentication. The user device 104 may provide the approval to the identity broker system 116.

Referring to FIG. 3C, at block 330, the identity broker system 116 generates the SPK for the user 102 using the DID (e.g., the DID fragment). For example, the identity broker system 116 may obtain the DID from the wallet system 118. Using a portion of the DID (e.g., a DID fragment), the identity broker system 116 may generate the SPK for the user 102. For instance, referring to the example from FIG. 4B, the identity broker system 116 may use a portion of the third element 426 that is specific to the user 102 (e.g., "userA" or "userAstring") as the DID fragment. The identity broker system 116 may generate the SPK for the user 102 based on the DID fragment. For instance, the generated SPK may be the DID fragment (e.g., the generated SPK may be "userA" or "userAstring").

Similarly, when the subject identifier is not a DID, the identity broker system 116 may generate the SPK based on a portion of the subject identifier. For instance, referring to FIG. 4A, based on at least a portion of the second element 404, the identity broker system 116 may determine a subject identifier fragment that is specific to the user 102. The identity broker system 116 may generate the SPK based on the subject identifier fragment. For example, the SPK may be the UUIN for the user 102 (e.g., element 404 from FIG. 4A).

At block 332, the identity broker system 116 may generate a pseudorandom function family (PRF) code based on the DDO public key (PK). For example, the identity broker system 116 may obtain the public key from the DDO and use the public key as an input to a PRF to obtain a PRF output. The PRF output may be the PRF code. Similarly, when the subject identifier document is not a DDO, the identity broker system 116 may generate the PRF code based on a public key from the subject identifier document.

In some variations, block 332 is optional. For example, the PRF code may be used to validate the user device 104. For example, the PRF code may be a sub-key to the SPK, and may be used to authenticate the user 102 and/or the user device 104. For instance, the password manager system 120 may store the PRF code and/or the SPK into a secure location (e.g., a secure location within the wallet system 118 and/or another database). Further, the password manager system 120 may provide the PRF code and the SPK to the user device 104. During SPK authentication, the user device 104 may provide the SPK to the identity broker 116 and/or the password manager system 120. The password manager system 120 may provide a challenge to the user device 104. The user device 104 may use the PRF code to sign the challenge and return the signed challenge to the password manager system 120. The password manager system 120 may use the stored PRF code to compute the signed challenge as well and compare the signed challenge from the user device 104 with the computed signed challenge. Based on the challenges matching, the password manager system 120 may determine that the user device 104 is authenticated.

At block 334, the identity broker system 116 provides the SPK and PRF code to the password manager system 120 to enroll the user 102 into SPK authentication. Additionally, and/or alternatively, the identity broker system 116 may provide the SPK and/or the PRF code to the user device 104. The user device 104 may store the SPK and/or the PRF code within its own memory or within the platform provider system 108.

At block 336, the password manager system 120 provides a confirmation to the user device 104 indicating that the user 102 enrolled into SPK authentication. In some examples, the confirmation may further include the SPK and/or the PRF code. For instance, as mentioned previously, the SPK may be provided to the user device 104 and the user device 104 may share the SPK (e.g., via BLUETOOTH or AIRDROP) to one or more other devices and/or entities. The SPK may be used for internal and/or external applications and/or domains managed, hosted, operated, and/or otherwise associated with the enterprise organization. For example, in addition to using the SPK to grant access to the domain managed by the back-end application system 302 (e.g., a first internal application back-end system 114), the SPK may further grant access to one or more additional domains hosted by one or more additional back-end application systems (e.g., one or more other internal application back-end systems 114 and/or external application back-end systems 110).

At block 338, the user device 104 obtains access to the requested content using the SPK. For example, based on providing the SPK, the back-end application system 302 may verify with the password manager system 120 that the user 102 and/or the user device 104 is allowed access to the requested content. For instance, the back-end application system 302 may provide a request to the password manager system 120 indicating whether the SPK received from the user device 104 is the same as the SPK stored in the secure location managed by the password manager system 120. The password manager system 120 may perform a comparison, and based on the comparison, the password manager system 120 may provide, to the back-end application system 302, an indication as to whether the user 102 and/or the user device 104 is authenticated. In some examples, as mentioned above, the password manager system 120 may use one or more encryption techniques on the SPK, and store the encrypted SPK into the secure location. At block 338, the password manager system 120 may use the encryption techniques on the received SPK and perform a comparison based on the encrypted received SPK.

In some variations, the user 102 might not provide approval for SPK authentication. For example, based on the prompt from block 328, the user device 104 may provide, to the identity broker system 116, user input indicating to not enroll the user 102 into SPK authentication. But, the user 102 and/or the user device 104 may still use the DID authentication to access content on the back-end application system 302. For example, the user device 104 may perform block 324 to determine that the user 102 is enrolled in DID authentication. Based on the determination, the identity broker system 116 may obtain the DID from the wallet system 118. In some examples, the identity broker system 116 may resolve the DID to obtain the location of the DDO. After resolving the DID, the identity broker system 116 may retrieve the public and/or private keys associated with the back-end application system 302. The identity broker system 116 may use the retrieved public and/or private keys to authenticate the user 102 and/or the user device 104 (e.g., based on performing a DDO challenge as described above). Based on the authentication, the identity broker system 116 and/or the back-end application system 302 may provide a confirmation to the user device 104 that the user 102 and/or the user device 104 is authenticated. The user device 104 may access the content based on receiving the confirmation.

In other examples, the user device 104 may resolve the DID to obtain the location of the DDO. For instance, the identity broker system 116 may forward the DID to the user device 104, and the user device 104 may resolve the DID. Then, similarly, the user device 104 may retrieve the public and/or private keys associated with the back-end application system 302. The user device 104 may use the retrieved public and/or private keys to authenticate the user 102 and/or the user device 104, and gain access to the requested content.

Figure 5:
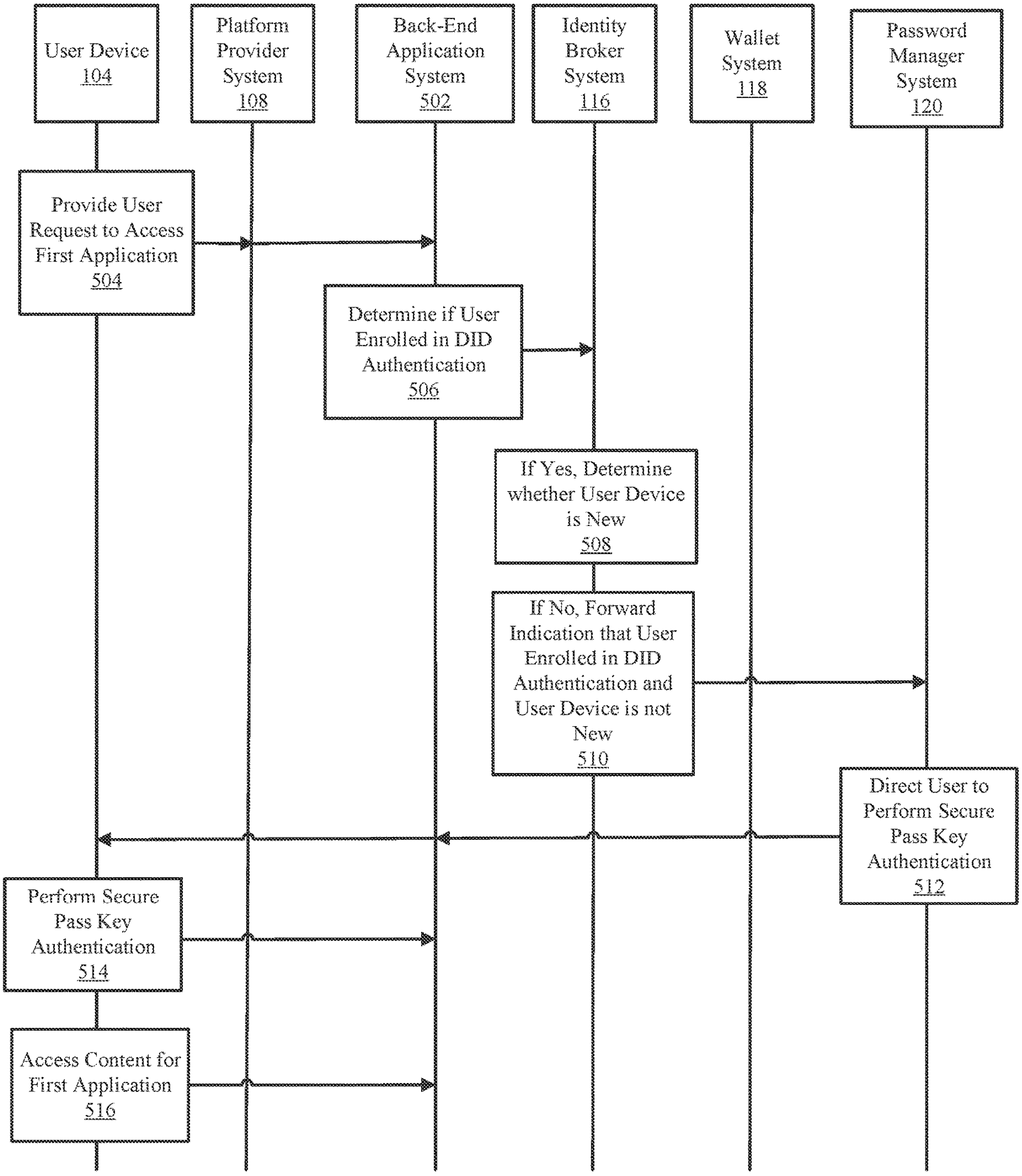
FIG. 5 shows another exemplary event sequence for subject identifier authentication and secure pass key authentication in accordance with one or more examples of the present application.

FIG. 5 shows another exemplary event sequence for subject identifier authentication and SPK authentication in accordance with one or more examples of the present application. However, the event sequence 500 is merely an example and other types of event sequences are contemplated herein including by performing any of the following blocks in any suitable order. The event sequence 500 includes operations, processes, and/or functions that are performed by one or more entities within the environment 100. For example, the event sequence 500 includes blocks performed by the user device 104, the platform provider system 108, a back-end application system 502 (e.g., one of the internal application back-end systems 114 and/or the external application back-end system 110), the identity broker system 116, the wallet system 118, and the password manager system 120.

At block 504, the user device 104 provides a user request to access a first application (e.g., content for the first application). The user device 104 may provide the user request to the platform provider system 108, and the platform provider system 108 may forward the user request to the back-end application system 502. In some instances, the user request may include device information associated with the user device 104.

In some examples, the event sequence 300 may be a first session (and/or second session) that is performed between the user device 104 and the enterprise cloud computing system 112. For example, in the first session, the user device 104 and/or the user 102 may have enrolled into DID authentication as well as SPK authentication. Then, event sequence 500 may be a subsequent session that is performed between the user device 104 and the enterprise cloud computing system 112. For example, at block 504, the user device 104 may seek access to the same application/domain as in event sequence 300 or a different application/domain from event sequence 300.

At block 506, the back-end application system 502 may determine if the user 102 is enrolled in DID authentication. The back-end application system 502 may perform block 506 similar to how the back-end application system 302 performed blocks 306 and/or 324 above (e.g., compare the username and/or other identifying information with information stored within the wallet system 118, perform identity verification using the authentication information, and/or perform a DDO challenge).

At block 508, the identity broker system 116 determines that the user 102 has enrolled in the DID authentication and determines whether the user device 104 is new. For example, referring back to FIG. 3A and event sequence 300, at block 308, the back-end application system 302 determines that the user 102 did not enroll in DID authentication. In contrast, in the event sequence 500, at block 508, the identity broker system 116 determines that the user 102 has enrolled in the DID authentication. Then, the identity broker system 116 determines whether the user device 104 is new. For instance, in event sequence 300 (e.g., during enrollment of the DID authentication), the back-end application system 302 and/or the identity broker system 116 may obtain device information associated with the user device 104 (e.g., at block 318 as described above). The device information may include any information associated with the user device 104 such as, but not limited to, a device identifier and/or a device fingerprint. The identity broker system 116 may store the device information in memory such as within the wallet system 118, and link the device information with other information associated with the user 102. In block 508, the identity broker system 116 may compare received device information with the stored device information (e.g., device information stored during the enrollment of the DID authentication). Based on the comparison, the identity broker system 116 may determine whether the user device 104 is new. In some examples, the user request from block 504 may include the device information. In other examples, at block 508, the identity broker system 116 provides a request to the user device 104, and the user device 104 provides the new device information based on the request.

At block 510, based on determining that the user device 104 is not new, the identity broker system 116 forwards an indication to the password manager system 120 that the user 102 enrolled in DID authentication and the user device 104 is not new.

At block 512, the password manager system 120 directs the user 102 to perform SPK authentication.

At block 514, the user device 104 performs SPK authentication with the back-end application system 502. For instance, the user device 104 provides the SPK to the back-end application system 502. The back-end application system 502 may authenticate the user 102 and/or the user device 104 based on the obtained SPK. Based on the authentication, the back-end application system 502 may grant access to the user 102 to the content.

For example, the back-end application system 502 may forward the SPK to the password manager system 120. Additionally, and/or alternatively, the user device 104 may provide the SPK to the identity broker system 116, and the identity broker system 116 may forward the SPK to the password manager system 120. Additionally, and/or alternatively, the user device 104 may provide the SPK directly to the password manager system 120. As described above, the password manager system 120 may compare the received SPK with the SPK stored in the secure location. Based on the SPKs matching, the password manager system 120 may provide an indication to the back-end application system 502 and/or the user device 104 that the user 102 and/or the user device 104 is authenticated. Additionally, and/or alternatively, based on the SPKs matching, the password manager system 120 may provide a request (e.g., directly or via the back-end application system 502 and/or the identity broker system 116) for a signed challenge using the PRF code (e.g., the PRF code generated in block 334). The user device 104 may sign the challenge with the PRF code. The password manager system 120 may sign a challenge using the PRF code stored in the secure location, and compare the signed challenges. Based on the signed challenges matching, the password manager system 120 may provide an indication to the back-end application system 502 and/or the user device 104 that the user 102 and/or the user device 104 is authenticated.

At block 516, the user device 104 accesses content for the first application.

Figure 6A:
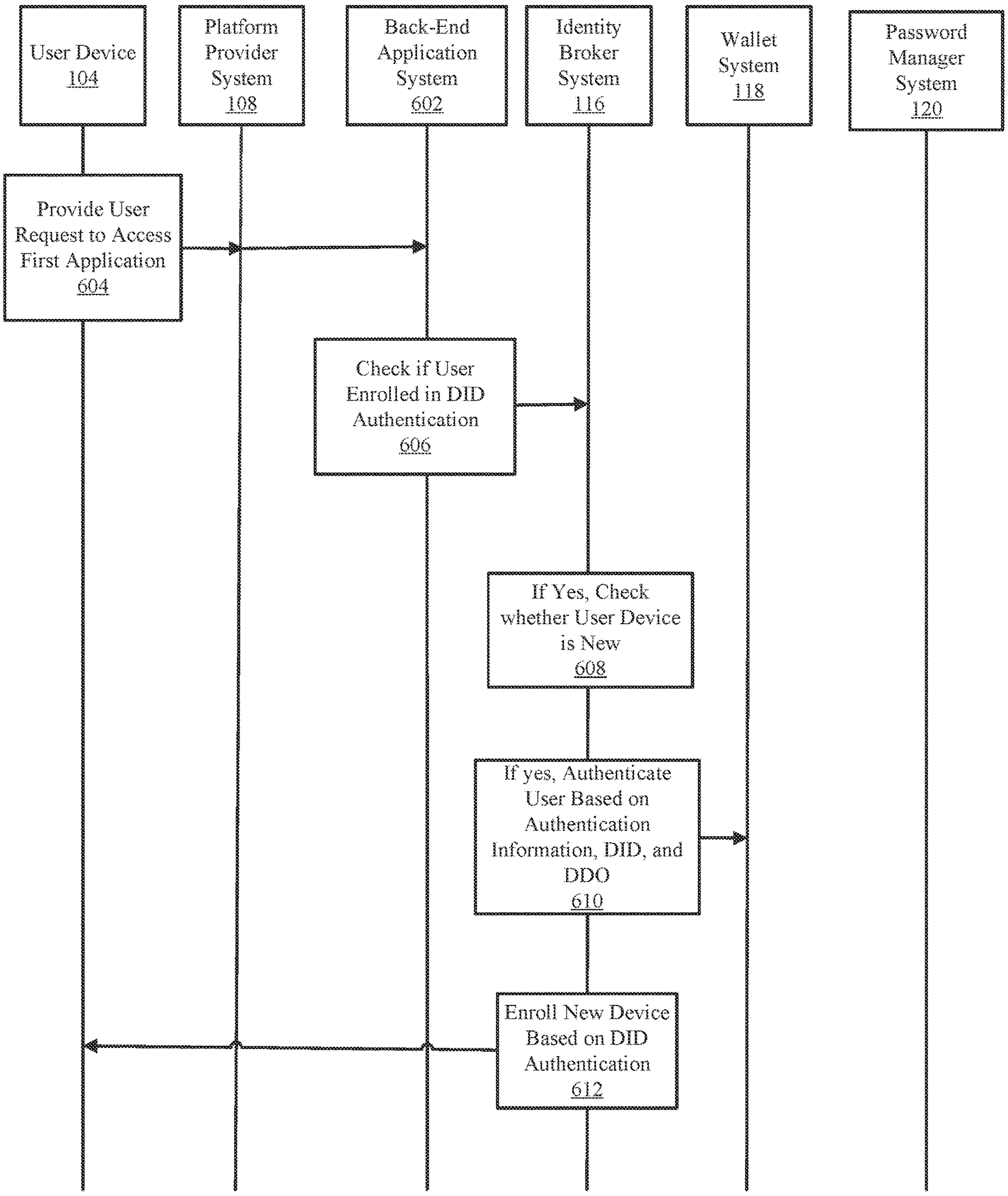
FIGS. 6A and 6B show yet another exemplary event sequence for subject identifier authentication and secure pass key authentication in accordance with one or more examples of the present application.
Figure 6B:
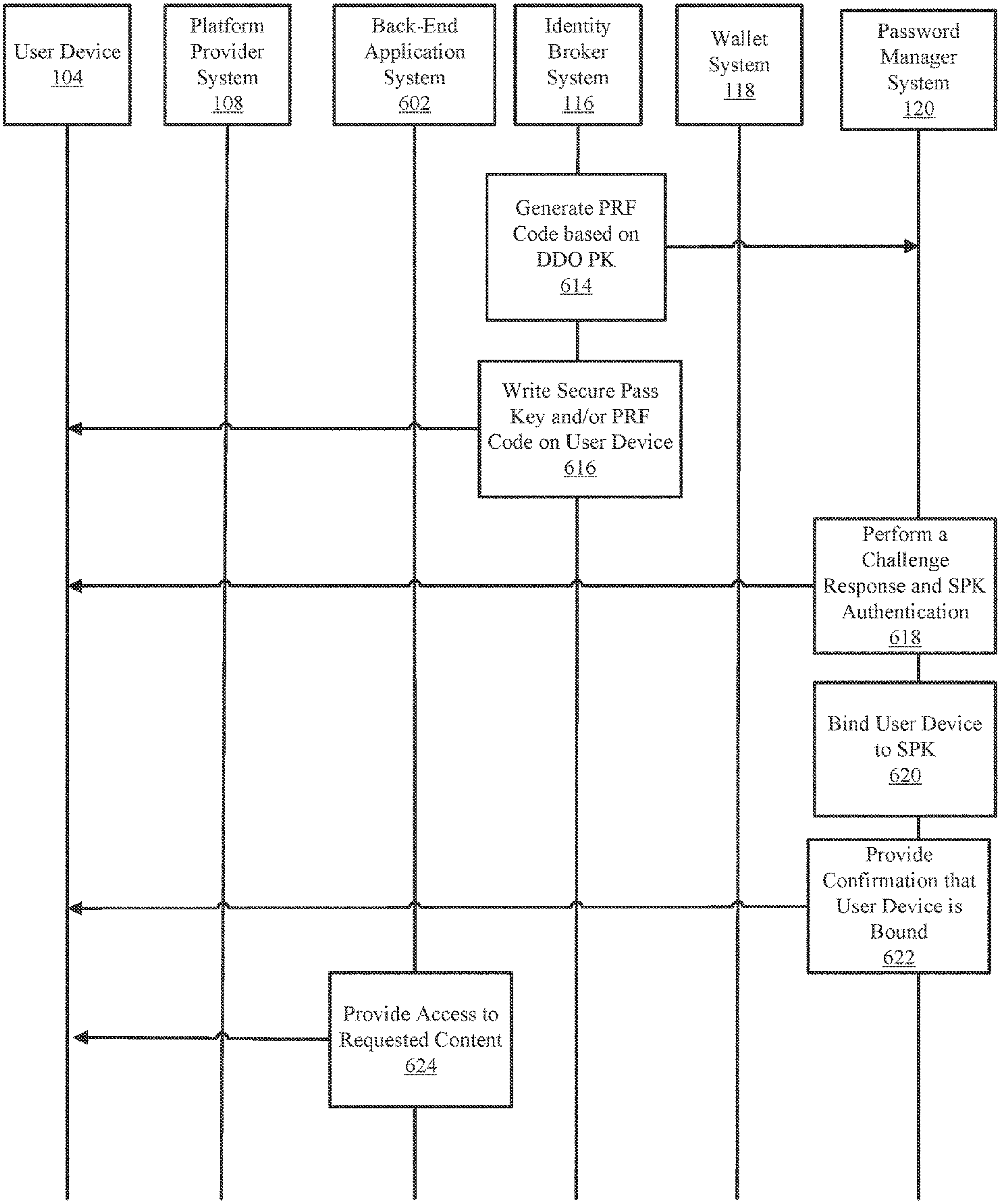

FIGS. 6A and 6B show yet another exemplary event sequence for subject identifier authentication and SPK authentication in accordance with one or more examples of the present application. However, the event sequence 600 is merely an example and other types of event sequences are contemplated herein including by performing any of the following blocks in any suitable order. The event sequence 600 includes operations, processes, and/or functions that are performed by one or more entities within the environment 100. For example, the event sequence 600 includes blocks performed by the user device 104, the platform provider system 108, a back-end application system 602 (e.g., one of the internal application back-end systems 114 and/or the external application back-end system 110), the identity broker system 116, the wallet system 118, and the password manager system 120.

At blocks 604-608, the functionality may be similar to blocks 504-508 from event sequence 500. For example, at block 604, the user device 104 provides a user request to access a first application (e.g., content for the first application). At block 606, the back-end application system 502 may determine if the user 102 is enrolled in DID authentication (e.g., compare the username and/or other identifying information with information stored within the wallet system 118). At block 608, the identity broker system 116 determines that the user 102 has enrolled in the DID authentication and determines whether the user device 104 is new.

At block 610, the identity broker system 116 determines that the user device 104 is new, and authenticates the user 102 based on user authentication information, the DID, and the DDO. For instance, in contrast to event sequence 500 where the identity broker system 116 determines that the user device 104 is not new, in event sequence 500, the identity broker system 116 determines that the user device 104 is new and initiates/performs DID authentication.

For example, similar to block 508, the identity broker system 116 may compare received device information with the stored device information (e.g., the device information stored during the enrollment of the DID authentication such as at block 318). Based on the comparison, the identity broker system 116 may determine that the user device 104 is new and may perform DID authentication. For example, to perform DID authentication, the identity broker system 116 may provide a request for authentication information from the user device 104. Based on the received authentication information, the identity broker system 116 may retrieve a DID from the wallet system 116. For example, based on the authentication information matching the user authentication enrollment information (e.g., a newly received biometric feature such as a facial scan matching a biometric feature of the user 102 that was obtained during the enrollment phase), the identity broker system 116 may confirm that the user 102 is using the new device (e.g., the user device 104). Subsequently, the identity broker system 116 may retrieve the DID from the wallet system, and may resolve the DID to obtain the DDO. The identity broker system 116 may perform a DDO challenge with the user device 104 using the key(s) from the DDO. For example, the identity broker system 116 may provide a challenge to the user device 104. The user device 104 may sign the challenge using a private key, and the identity broker system 116 may determine whether the user 102 is authenticated based on the signed challenge and the DDO.

At block 612, the identity broker system 116 enrolls the new device based on DID authentication (e.g., based on the user 102 being authenticated after performing the DDO challenge). For example, the identity broker system 116 may request device information from the user device 104. The user device 104 may provide the request information (e.g., a device identifier or device fingerprint associated with the user device 104). The identity broker system 116 may store the device information into memory such as the wallet system 118. Additionally, and/or alternatively, the identity broker system 116 may link the device information with the DID, DDO, and/or other information associated with the user 102 and/or the user device 104. As such, the identity broker system 116 may bind the user device 104 to the DID as well as other information associated with the user 102 and/or the user device 104. Additionally, and/or alternatively, the identity broker system 116 may provide a confirmation that the user device 104 is bound to the user device 104. In some variations, the password manager system 120 may enroll the new device based on the DID authentication. For example, the identity broker system 116 may provide a prompt to the password manager system 120 that the user 102 is authenticated. The password manager system 120 may perform block 612 such as by binding the user device 104 to the DID as well as other information associated with the user 102 and/or the user device 104. Additionally, and/or alternatively, the password manager system 120 may provide a confirmation that the user device 104 is bound to the user device 104.

Referring to FIG. 6B, at block 614, the identity broker system 116 generates a PRF code based on the DDO public key (PK), and provides the PRF code to the password manager system 120. For example, similar to block 334 of event sequence 300, the identity broker system 116 generates the PRF code based on the DDO PK. The identity broker system 116 may further provide the PRF code to the password manager system 120. The password manager system 120 may store the PRF code in a secure location (e.g., a secure location within the wallet system 118). As such, in event sequence 300, the identity broker system 116 provides a first PRF code for the first user device that was enrolled in SPK authentication. In event sequence 600, based on determining that a new device is seeking access to the content, the identity broker system 116 provides a second PRF code for the second user device. Subsequently, the user 102 may use the first and/or second user device (e.g., use the first and/or second PRF codes) to authenticate itself during SPK authentication.

At block 616, the identity broker system 116 writes the SPK and/or the PRF code on the user device 104. For example, the identity broker system 116 may provide the SPK and/or the PRF code to the user device 104, and the user device 104 may store the SPK and/or the PRF code.

At block 618, the password manager system 120 performs a challenge response (e.g., DDO challenge response) and SPK authentication. For example, during SPK authentication, the user device 104 may provide the SPK to the identity broker 116 and/or the password manager system 120. The password manager system 120 may provide a challenge to the user device 104. The user device 104 may use the PRF code to sign the challenge and return the signed challenge to the password manager system 120. The password manager system 120 may use the stored PRF code to compute the signed challenge as well and compare the signed challenge from the user device 104 with the computed signed challenge. Based on the challenges matching, the password manager system 120 may determine that the user device 104 is authenticated.

At block 620, the password manager system 120 binds the user device 104 to the DID. For instance, the password manager system 120 may link the SPK to the other information that is stored within the wallet system 118 such as the DID, the DDO, the device information, the user authentication enrollment information, and/or other information associated with the user 102. As such, in a subsequent iteration, when receiving the SPK from the user device 104, the password manager system 120 may determine that the device information from the user device 104 is linked to the SPK within the wallet system 118, and provide access to the content without performing the challenge response and SPK authentication at block 618.

At block 622, the password manager system 120 provides a confirmation that the user device 104 is bound. For example, the password manager system 120 may provide a confirmation indicating that the user 102 and the user device 104 is granted access to the content, and that the user device 104 is bound to the SPK. The password manager system 120 may provide this confirmation to the user device 104 and/or the back-end application system 602.

At block 624, the back-end application system 602 provides access to the requested content. For example, the back-end application system 602 may obtain an indication that the user device 104 and/or the user 102 is authenticated from the identity broker system 116, the password manager system 120, and from the user device 104 itself. Based on the confirmation, the back-end application system 602 may grant access to the requested content. The user device 104 may then access the requested content.

Figure 7A:
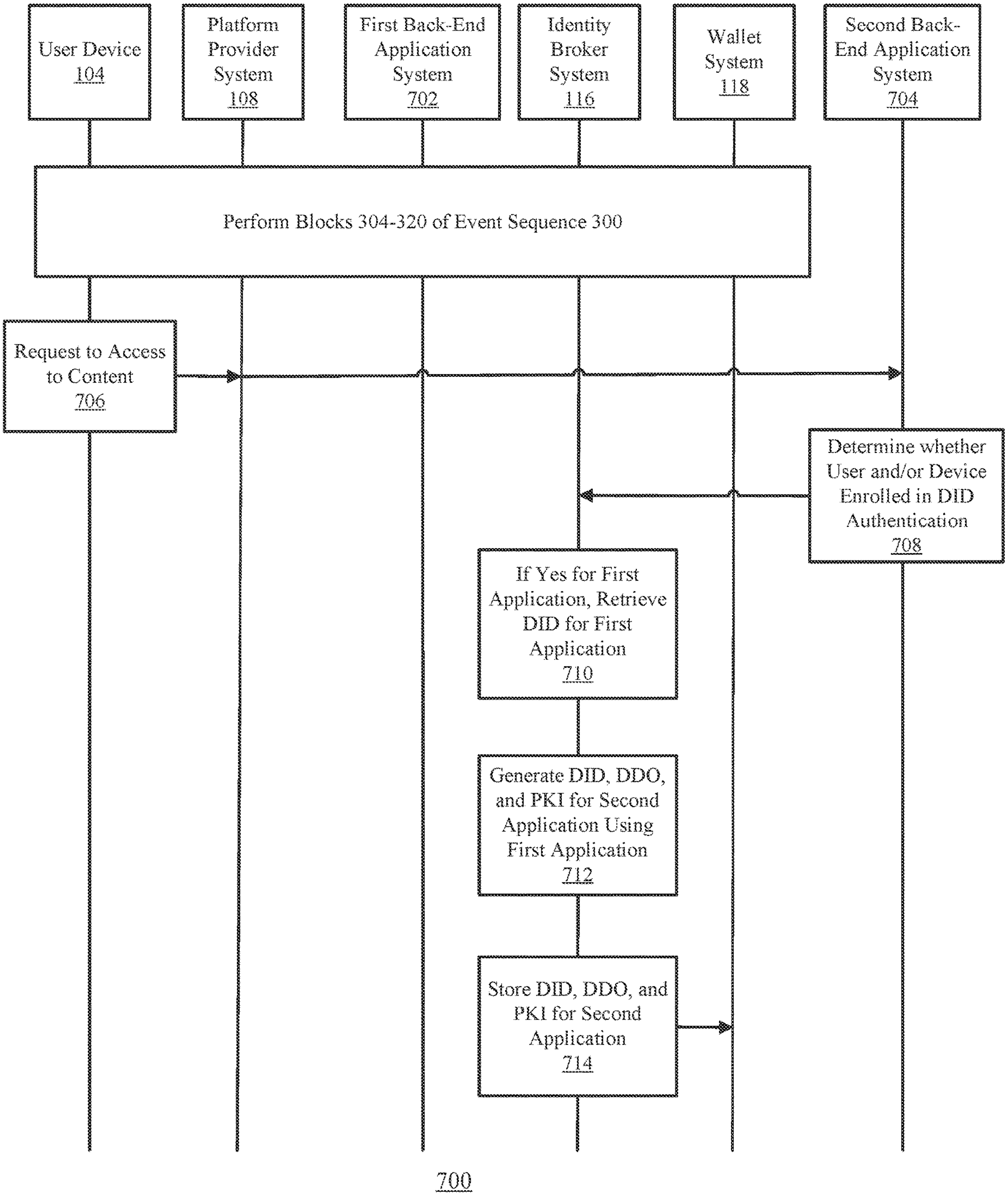
FIGS. 7A and 7B show another exemplary event sequence for subject identifier authentication and generation of a second subject identifier based on the first subject identifier in accordance with one or more examples of the present application.
Figure 7B:
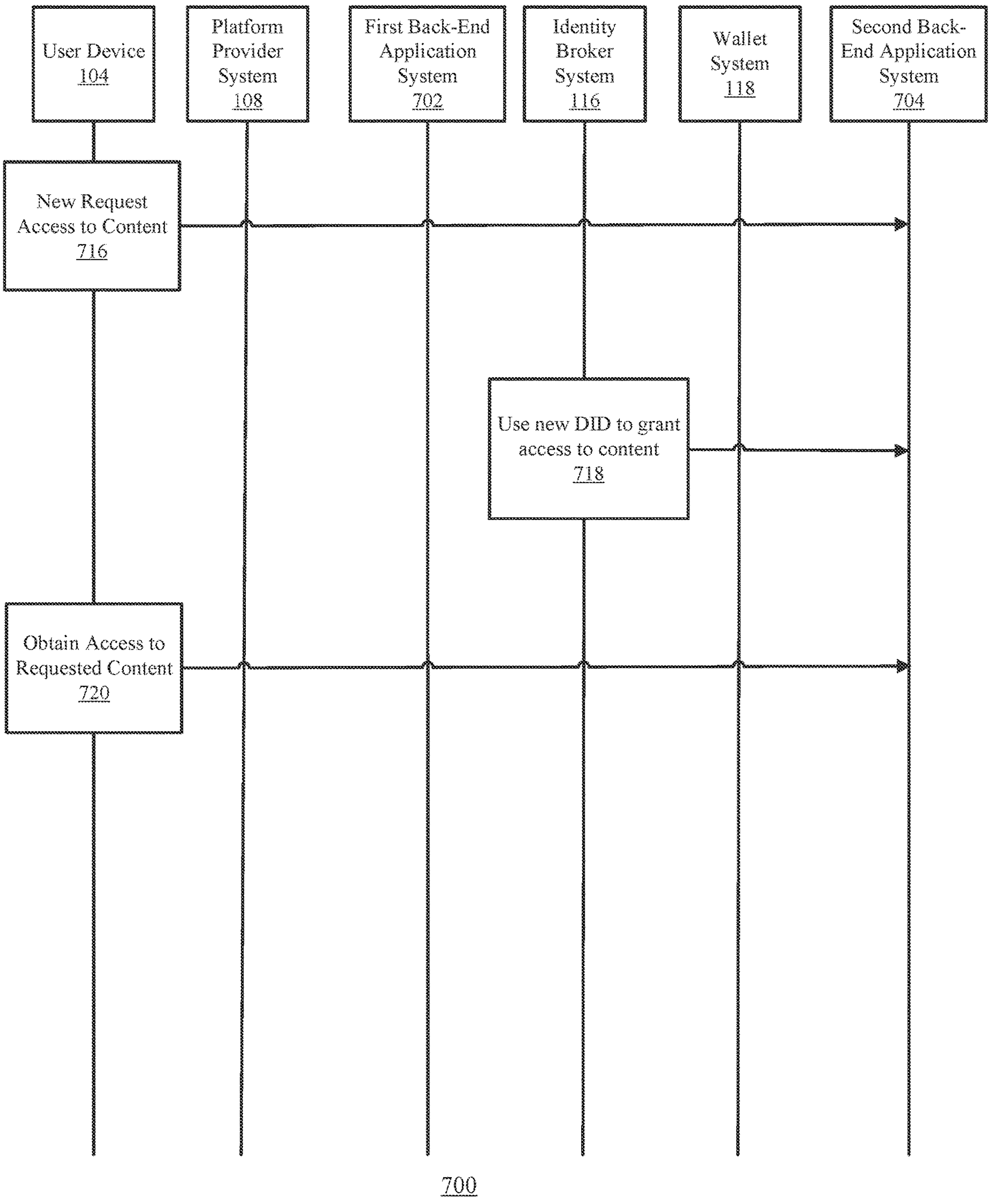

FIGS. 7A and 7B show another exemplary event sequence for subject identifier authentication and generation of a second subject identifier (e.g., a second DID) in accordance with one or more examples of the present application. However, the event sequence 700 is merely an example and other types of event sequences are contemplated herein including by performing any of the following blocks in any suitable order. The event sequence 700 includes operations, processes, and/or functions that are performed by one or more entities within the environment 100. For example, the event sequence 700 includes blocks performed by the user device 104, the platform provider system 108, a first back-end application system 702 (e.g., one of the internal application back-end systems 114 and/or the external application back-end system 110), the identity broker system 116, the wallet system 118, and a second back-end application system 704 (e.g., another one of the internal application back-end systems 114 and/or the external application back-end system 110).

Referring to FIG. 7A, initially, the user device 104, the platform provider system 108, a first back-end application system 702, the identity broker system 116, the wallet system 118 may perform blocks 304-320 of event sequence 300 as described above. The first back-end application system 702 may be the back-end application system 302 described in event sequence 300. As such, the identity broker system 116 may generate and store the DID, the DDO, and the private and/or public keys for the first application (e.g., the first application associated with the first back-end application system 702) in the wallet system 118. Additionally, and/or alternatively, the identity broker system 116 may link further information (e.g., the user identification information for the first application, the device information, and/or the user authentication enrollment information) to the DID, the DDO, and the private and/or public keys for the first application. Thus, the identity broker system 116 may perform identity binding and/or device binding for the user 102.

At block 706, the user device 104 requests access for content on the second back-end application system 704. The second back-end application system 704 may host a different domain from the first back-end application system 302. For example, the first back-end application system 702 may be one of the internal application back-end systems 114. The second back-end application system 704 may be another one of the internal application back-end systems 114 or an external application back-end system 110. For instance, a second enterprise organization may subscribe to the DID authentication provided by the first enterprise organization. In such instances, the second back-end application system 704 may be an external application back-end system 110 associated with the second enterprise organization.

At block 708, the second back-end application system 704 may determine whether the user 102 and/or the user device 104 is enrolled in DID authentication. At block 710, the identity broker system 116 may determine that the user 102 and/or the user device 104 is enrolled in DID authentication for the first application, but not for the second application. For example, the request from block 706 may indicate user identification information for the second application such as a username, password, and/or other user ID to log onto the second application. The second back-end application system 704 may provide the user identification information to the identity broker system 116. The identity broker system 116 may determine that the user identification information for the second application is not linked to a particular DID, DDO, and/or PKI. However, the identity broker system 116 may provide a request for authentication information and/or device information to the user device 104 to perform device and/or identity verification. For example, the user device 104 may provide the authentication information (e.g., biometric information of the user 102) and/or the device information (e.g., a device ID of the user device 104). The identity broker system 116 may compare the authentication information and/or the device information with stored information within the wallet system 118 to determine that the user 102 and/or the user device 104 has enrolled into DID authentication for the first application. For example, based on determining the authentication information matches the user authentication enrollment information and/or the device information matches the device information during the enrollment for the DID authentication, the identity broker system 116 may determine that the user 102 and/or the user device 104 has enrolled into DID authentication for the first application.

After determining that the user 102 and/or the user device 104 has enrolled into DID authentication for the first application, the identity broker system 116 may retrieve the DID for the first application that is linked to the user authentication enrollment information and/or the device information (e.g., based on identity binding and/or device binding for the user 102 and/or the user device 104).

At block 712, the identity broker system 116 may generate a DID, DDO, and/or PKI for the second application (e.g., for the application hosted by the second back-end application system 704) based on the DID for the first application. For example, the identity broker system 116 may use a DID fragment/subject identifier fragment to generate the DID for the second application. For instance, the DID fragment may be "userAstring" and the entire DID for the first application may be "DID:web:userAstring.domain1". Using the DID fragment for the first application, the identity broker system 116 may generate a DID for the second application. For instance, using "userAstring", the identity broker system 116 may generate a DID such as "DID:web:userAstring.domain2". The identity broker system 116 may further generate a DDO and/or PKI for the second application. The DID for the second application may resolve to the DDO for the second application.

At block 714, the identity broker system 116 may store the DID, DDO, and PKI for the second application into the wallet system 118. In addition, the identity broker system 116 may link (e.g., bind) the DID, DDO, and PKI for the second application with the DID, DDO, and PKI for the first application as well as other information such as the user authentication enrollment information, the device information, the user identification information for the first and second applications, the application identifiers for the first and second applications, and/or additional information.

Referring to FIG. 7B, at block 716, the user device 104 may provide a new request to access content. For example, in a second session, the user device 104 may seek to access the content again from the second back-end application system 704.

At block 718, the identity broker system 116 may use the new DID to grant access to the content. For example, based on the new request, which may indicate the user identification information for the second application, the identity broker system 116 may perform DID authentication. For example, the identity broker system 116 may request and obtain authentication information and/or device information. Based on comparing the authentication information and/or device information with stored information within the wallet system 118, the identity broker system 116 may determine that the user device 104 and/or the user 102 has enrolled into DID authentication for the second application. The identity broker system 116 may further retrieve the DID for the second application (e.g., "DID:web:userAstring.domain2"), and resolve the DID to obtain the DDO for the second application, which includes the public and/or private keys for the second application. The identity broker system 116 may perform a DDO challenge using the DDO (e.g., the key(s) from the DDO) and based on a successful challenge, the identity broker system 116 may grant access to the user device 104 to the requested content. The identity broker system 116 may provide an indication to the second back-end application system 704 and/or the user device 104 that the user 102 and/or the user device 104 is granted access to the requested content hosted on the second back-end application system 704.

At block 720, the user device 104 obtains access to the requested content.

Figure 8:
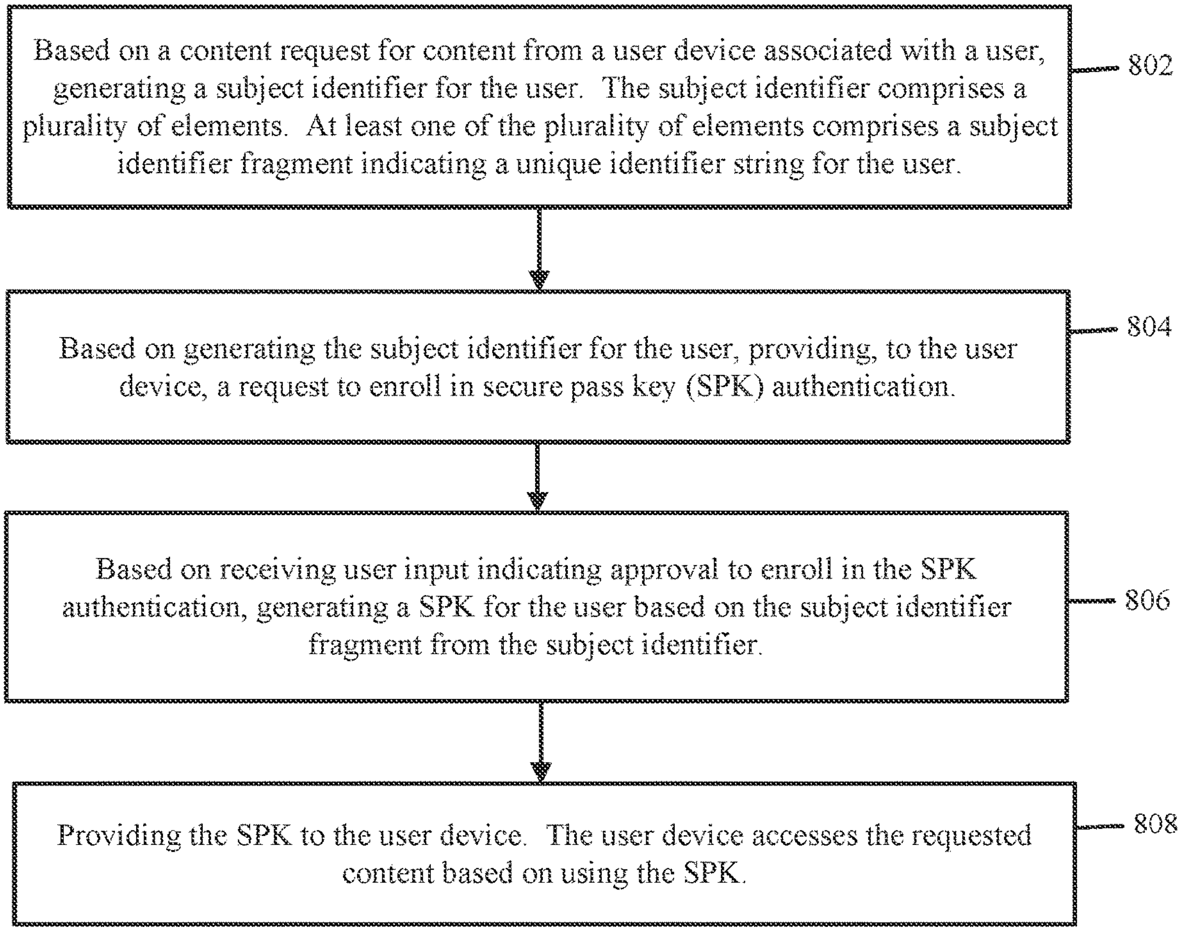
FIG. 8 is an exemplary process for user authentication using the subject identifier and secure pass key authentication in accordance with one or more examples of the present application.

FIG. 8 is an exemplary process for user authentication using the subject identifier and secure pass key authentication in accordance with one or more examples of the present application. The process 800 may be performed by the enterprise cloud computing system 112 (e.g., the identity broker 116) of environment 100 shown in FIG. 1. It will be recognized that any of the following blocks may be performed in any suitable order, and that the process 800 may be performed in any suitable environment. The descriptions, illustrations, and processes of FIG. 8 are merely exemplary and the process 800 may use other descriptions, illustrations, and processes for user authentication using the subject identifier and secure pass key authentication. In some examples, process 800 may be based on the event sequences 300, 500, and/or 600 described above.

At block 802, based on a content request for content from a user device associated with a user, the enterprise cloud computing system 112 (e.g., the identity broker 116) generates a subject identifier for the user. The subject identifier comprises a plurality of elements. At least one of the plurality of elements comprises a subject identifier fragment indicating a unique identifier string for the user. For example, as mentioned above in event sequence 300, the user device 104 may provide a content request to access content to a back-end application system (e.g., the back-end application system 302). The back-end application system may be associated with (e.g., host and/or manage) a domain, and may receive the content request from the user device 104. The back-end application system may provide an identification request to the identity broker 116 to determine whether the user is enrolled in subject identifier authentication. The identity broker system 116 may determine whether the user is enrolled in subject identifier authentication (e.g., as described in block 306). Based on determining that the user is not enrolled in subject identifier authentication, the identity broker system 116 may provide a request to the user device 104 to request the user device 104 to enroll in subject identifier authentication. The user device 104 may provide approval for the subject identifier authentication. Afterwards, the identity broker system 116 may generate a subject identifier, a subject identifier document, and a public and private key pair.

In some examples, the subject identifier is a DID, which includes element such as a scheme element, a DID method element, and a namespace specific string. The portion of the namespace specific string of the DID may indicate the subject identifier fragment.

In some variations, for the subject identifier authentication, the enterprise cloud computing system 112 may further perform identity binding and/or device binding. For example, to perform identity binding, the enterprise cloud computing system 112 may perform blocks 316-320 of event sequence 300 and/or use other methods (e.g., generating QR codes and/or using authentication information from the platform provider system 108). For instance, the enterprise cloud computing system 112 may obtain user authentication enrollment information such as biometric features of the user 102. Additionally, and/or alternatively, the enterprise cloud computing system 112 may obtain device information (e.g., a device fingerprint) from the user device 104. The enterprise cloud computing system 112 may perform identity binding based on binding the user authentication enrollment information to the generated subject identifier. Further, the enterprise cloud computing system 112 may perform device binding based on binding the device information from the user device 104 to the generated subject identifier.

At block 804, based on generating the subject identifier for the user, the enterprise cloud computing system 112 provides, to the user device 104, a request to enroll in SPK authentication. The user device 104 may display a display screen indicating options for the user 102 to enroll into SPK authentication. The user device 104 may provide user input indicating approval to enroll in SPK authentication.

At block 806, based on receiving the user input indicating approval to enroll in SPK authentication, the enterprise cloud computing system 112 generates a SPK for the user 102 based on the subject identifier fragment from the subject identifier. For example, in the same session as the initial content request or in a second content request from the user device 104, the enterprise cloud computing system 112 may provide a request to enroll in SPK authentication. The user device 104 may authenticate using subject identifier authentication (e.g., by performing device verification and/or identity verification). For example, to perform identity verification, the enterprise cloud computing system 112 may obtain authentication information from the user device 104 and compare the authentication information with the stored user authentication enrollment information, which may be stored in the wallet system 118. Based on the comparison, the enterprise cloud computing system 112 may determine whether the user 102 is verified. Additionally, and/or alternatively, to perform device verification, the enterprise cloud computing system 112 may obtain device information from the user device 104 and compare the device information with the stored device information, which may also be stored in the wallet system 118. Based on the comparison, the enterprise cloud computing system 112 may determine whether the user device 104 is verified. After determining that the user 102 and/or the user device 104 is verified, the enterprise cloud computing system 112 may retrieve the subject identifier and/or the subject identifier document that is linked to the device information and/or user authentication enrollment information based on the identity binding and/or the device binding. The enterprise cloud computing system 112 may generate the SPK based on the subject identifier fragment from the retrieved subject identifier.

In some examples, prior to and/or as an alternative to performing the device verification and/or the identity verification, the enterprise cloud computing system 112 may perform subject identifier authentication based on comparing user information with stored information within a wallet system. For example, the content request may indicate user information such as a username and/or user ID. The identification request may further indicate the user information. The identity broker system 116 may compare the user information with information stored within the wallet system 118 to determine whether the user 102 is enrolled in subject identifier authentication (e.g., if the user information is linked to a subject identifier).

In some variations, in addition to generating the SPK, the enterprise cloud computing system 112 may further generate a PRF code. For example, using the public key from the subject identifier document and a PRF function, the enterprise cloud computing system 112 may generate a PRF code. Additionally, and/or alternatively, the enterprise cloud computing system 112 may link (e.g., bind) the PRF code and/or the SPK with the subject identifier and/or other information (e.g., device information and/or user authentication enrollment information).

In some instances, the enterprise cloud computing system 112 may perform the subject identifier authentication based on using a DDO challenge, which is described above. For example, in addition to and/or as an alternative to the identity verification and/or the device verification, the enterprise cloud computing system 112 may use a DDO challenge to verify the user 102 and/or the user device 104.

At block 808, the enterprise cloud computing system 112 provides the SPK to the user device 104. The user device 104 accesses the request content based on using the SPK. For example, after generating the SPK, the identity broker system 116 may provide the SPK to the user device 104 as well as the password manager system 120. The password manager system 120 may store the SPK in a secure location (e.g., a secure location in the wallet system 118). Then, the user device 104 may provide the SPK to the password manager system 120. The password manager system 120 may retrieve the stored SPK and compare the stored SPK with the received SPK. Based on the comparison, the password manager system 120 may grant access to the user device 104 to the content on the domain. For instance, the password manager system 120 may provide instructions to the back-end application system to grant access to the requested content to the user device 104.

In some instances, the password manager system 120 may further use the PRF code to perform a verification prior to granting access to the requested content. For example, the password manager system 120 may provide a challenge to the user device 104. The user device 104 may sign the challenge using the PRF code and provide the signed challenge to the password manager system 120. The password manager system 120 may provide instructions to the back-end application system to grant access to the requested content to the user device 104 based on using the signed challenge and the PRF code stored in the wallet system 118.

In some examples, the enterprise cloud computing system 112 may receive a second identification request associated with a second content request for accessing the content on the domain. For example, as described in event sequences 500 and 600, a user device (e.g., the same user device that provided the request at block 802 or a different user device) may provide the second content request. Based on receiving the second identification request, the enterprise cloud computing system 112 may determine whether the user 102 is enrolled in the subject identifier authentication by performing identity verification, which is described above. Additionally, and/or alternatively, the enterprise cloud computing system 112 may use a DDO challenge to verify the user 102 and/or the user device 104. Based on the identity verification and/or using the DDO challenge, the enterprise cloud computing system 112 may determine whether the user device used for the second content request is enrolled in device verification. The user 102 and/or the user device used for the second content request is granted access to the content on the domain based on performing the device verification.

For instance, the device verification is described above. Based on determining that the user device that was used for the second content request is enrolled in the device verification (e.g., the user device used for the second content request is the same user device 104 that was used in the initial content request), the identity broker system 116 provides enrollment information indicating the enrollment of the user device 104 to the password manager system 120. The password manager system 120 receives the enrollment information and provides a SPK request to the user device 104. The password manager system 120 may receive the SPK from the user device 104 and provide an indication to grant access to the content in response to the second content request based on the received SPK from the user device 104.

Based on determining that the user device that was used for the second content request is not enrolled in the device verification (e.g., the user device used for the second content request is not the same user device 104 that was used in the initial content request), the identity broker system 116 provides an identity verification request to the user device. The user device provides authentication information to the identity broker system 116. The identity broker system 116 compares the authentication information with the user authentication enrollment information stored in the wallet system 118, which is linked to the subject identifier and/or the SPK. Based on the comparison, the identity broker system 116 obtains device information for the user device that was used for the second content request, links the device information with the generated subject identifier to perform device binding for the new user device. The identity broker system 116 provides information indicating the linking of the device information with the generated subject identifier to the password manager system 120. The password manager system 120 grants access to the content based on receiving the information.

Figure 9:
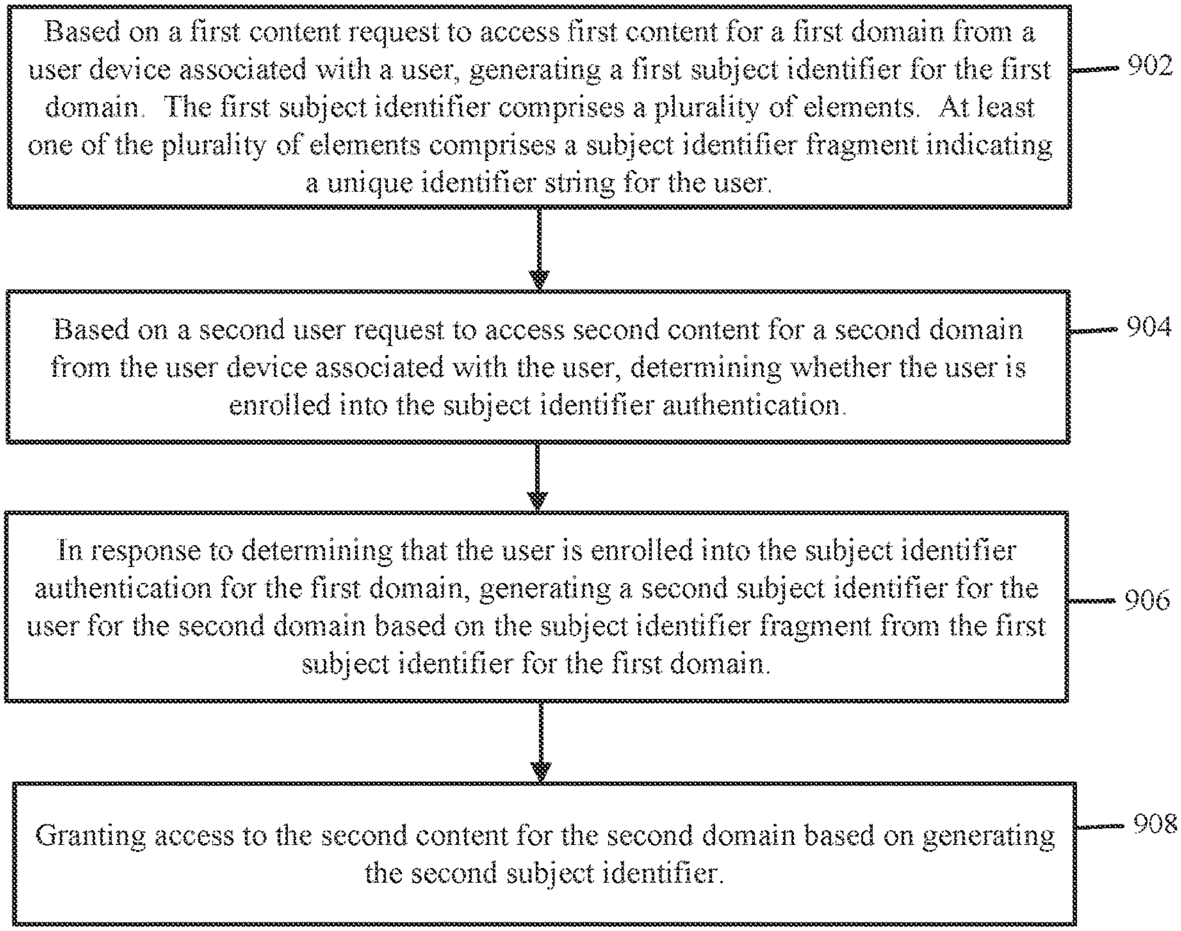
FIG. 9 is an exemplary process for user authentication using the subject identifier and subject identifier documents in accordance with one or more examples of the present application.

FIG. 9 is an exemplary process for user authentication using the subject identifier and subject identifier documents in accordance with one or more examples of the present application. The process 900 may be performed by the enterprise cloud computing system 112 (e.g., the identity broker 116) of environment 100 shown in FIG. 1. It will be recognized that any of the following blocks may be performed in any suitable order, and that the process 900 may be performed in any suitable environment. The descriptions, illustrations, and processes of FIG. 9 are merely exemplary and the process 900 may use other descriptions, illustrations, and processes for user authentication using the subject identifier and subject identifier documents. In some examples, process 900 may be based on the event sequence 700 described above.

At block 902, based on a first content request to access first content for a first domain from a user device associated with a user, the enterprise cloud computing system 112 generates a first subject identifier for the first domain. The first subject identifier comprises a plurality of elements. At least one of the plurality of elements comprises a subject identifier fragment indicating a unique identifier string for the user. For example, a first application back-end system that is associated with (e.g., host and/or manage) a first domain may receive a first content request for accessing content on the first domain from a user device 104 from a user 102. The first application back-end system may provide a first identification request to the identity broker system 116. The identity broker system 116 may determine whether the user 102 is enrolled in subject identifier authentication (e.g., based on identity verification, device verification, and/or user information within the first content request). Based on determining that the user 102 is not enrolled in the subject identifier authentication, the enterprise cloud computing system 112 generates a first subject identifier for the first domain.

In some examples, the first subject identifier may be a DID that includes a scheme element, a DID method element, and a namespace specific string. The portion of the namespace specific string may indicate the subject identifier fragment.

In some instances, the identity broker system 116 may determine whether the user 102 is enrolled in subject identifier authentication based on identity verification. For example, the identity broker system 116 may provide an identity request for use in identity binding. The identity broker system 116 may receive user authentication enrollment information from the user device 104, and perform identity binding for the user 102 by binding the user authentication enrollment information with the generated first subject identifier for the user.

In some variations, the identity broker system 116 may determine whether the user 102 is enrolled in subject identifier authentication based on device verification. For example, the identity broker system 116 may provide a device request for use in device binding. The identity broker system 116 may receive device information from the user device 104, and perform device binding for the user 102 by binding the device information with the generated first subject identifier for the user.

At block 904, based on a second user request to access second content for a second domain from the user device 104 associated with the user 102, the enterprise cloud computing system 112 determines whether the user is enrolled into the subject identifier authentication. For instance, the user device 104 may provide a second content request for accessing content on a second domain associated with a second back-end application system. The second back-end application system may provide a second identification request to the identity broker system 116. Based on the second identification request, the identity broker system 116 determines whether the user 102 is enrolled into subject identifier authentication. For example, as mentioned above in blocks 708 and 710, the identity broker system 116 may determine whether the user 102 is enrolled into the subject identifier authentication based on performing device verification and/or identity verification.

At block 906, in response to determining that the user is enrolled into the subject identifier authentication for the first domain, the enterprise cloud computing system 112 generates a second subject identifier for the user for the second domain based on the subject identifier fragment from the first subject identifier for the first domain. For example, based on performing the device verification and/or the identity verification, the identity broker system 116 may determine that the user 102 is not enrolled into the subject identifier authentication for the second domain, but is enrolled the subject identifier authentication for the first domain. The identity broker system 116 may retrieve the first subject identifier for the first domain, and as mentioned in block 712, the identity broker system 116 may generate a second subject identifier based on the first subject identifier for the first domain (e.g., the subject identifier fragment from the first domain).

In some instances, the identity broker system 116 may further generate a subject identifier document for the second domain and one or more public/private key pairs for the second domain. The identity broker system 116 may include the public key from the key pairs into the subject identifier document. Further, the identity broker system 116 may store and link the first and second subject identifiers, the subject identifier document (e.g., for both the first/second domains), the device information, and/or the user authentication enrollment information within the wallet system 118.

At block 908, the enterprise cloud computing system 112 grants access to the second content for the second domain based on generating the second subject identifier.

In some variations, the enterprise cloud computing system 112 receives a new content request for accessing the content on the second domain. The identity broker system 116 may determine that the user is enrolled in the subject identifier authentication for the second domain using the second subject identifier, and provide instructions to the second back-end application system to grant access to the content based on determining that the user is enrolled in the subject identifier authentication for the second domain. For example, the identity broker system 116 may perform identity verification and/or device verification to determine that the user is enrolled in the subject identifier authentication. Additionally, and/or alternatively, the identity broker system 116 may provide a challenge to the user device 104. The user device 104 may sign the challenge using the private key for the second domain, and provide the signed challenge back to the identity broker system 116. The identity broker system 116 may resolve the second subject identifier to determine a storage location of a subject identifier document, and retrieve the public key for the second domain that is included within the subject identifier document. The identity broker system 116 may verify that the user 102 is enrolled in the subject identifier authentication based on using the public key from the subject identifier document and the signed challenge from the user device.

A number of implementations have been described. Nevertheless, it will be understood that additional modifications may be made without departing from the scope of the inventive concepts described herein, and, accordingly, other examples are within the scope of the following claims. For example, it will be appreciated that the examples of the application described herein are merely exemplary. Variations of these examples may become apparent to those of ordinary skill in the art upon reading the foregoing description. The inventor expects skilled artisans to employ such variations as appropriate, and the inventor intends for the application to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

The invention claimed is:

1. A system, comprising:

a back-end application system;

an identity broker system; and a password manager system, wherein the back-end application system is associated with a domain and is configured to:

receive a content request for accessing content on the domain from a first user device associated with a user; and based on the content request, provide an identification request to the identity broker system, wherein the identity broker system is configured to:

based on receiving the identification request, determine whether the user is enrolled in subject identifier authentication;

based on determining that the user is not enrolled in the subject identifier authentication, generate a subject identifier for the user, wherein the subject identifier comprises a plurality of elements, wherein at least one of the plurality of elements comprises a subject identifier fragment, wherein the subject identifier fragment indicates a unique identifier string for the user;

based on generating the subject identifier for the user, provide, to the first user device, a request to enroll in secure pass key (SPK) authentication;

based on receiving user input from the first user device indicating approval to enroll in the SPK authentication, generate a SPK for the user based on the subject identifier fragment from the subject identifier; and provide the SPK to the first user device and to the password manager system, wherein the password manager system is configured to:

store the SPK received from the identity broker system;

receive the SPK from the first user device; and grant access to the first user device to content on the domain based on comparing the stored SPK with the received SPK, and wherein the identity broker system is further configured to:

receive a second identification request associated with a second content request for accessing the content on the domain;

in response to receiving the second identification request, determine whether the user is enrolled in the subject identifier authentication by performing identity verification; and based on determining that the user is enrolled in the subject identifier authentication by performing the identity verification, determine whether a second user device used for the second content request is enrolled in device verification, and wherein the user is granted access to the content on the domain based on whether the second user device is enrolled in the device verification.

2. The system of claim 1, wherein the subject identifier is a decentralized identifier (DID), wherein the plurality of elements of the DID comprise a scheme element, a DID method element, and a namespace specific string, wherein a portion of the namespace specific string indicates the subject identifier fragment, and wherein the identity broker system is configured to generate the SPK for the user by:

generating the SPK such that the subject identifier fragment indicated by the portion of the namespace specific string of the DID is the SPK.

3. The system of claim 1, wherein the content request indicates user information of the user and the identification request comprises the user information, and wherein the identity broker system is configured to determine whether the user is enrolled in the subject identifier authentication by:

comparing the user information with stored information within a wallet system; and determining that the user is not enrolled in subject identifier authentication based on the comparison.

4. The system of claim 1, wherein the identity broker system is further configured to:

subsequent to generating the subject identifier for the user, provide, to the first user device, an identity request for use in identity binding;

receive, from the first user device, user authentication enrollment information indicating one or more biometric features of the user; and perform the identity binding for the user by binding the user authentication enrollment information with the generated subject identifier for the user, wherein providing the request to enroll in SPK authentication is based on performing the identity binding.

5. The system of claim 4, wherein the identity broker system is further configured to:

provide, to the first user device, a device request for use in device binding;

receive, from the first user device, device information associated with the first user device; and perform the device binding for the first user device by binding the device information with the generated subject identifier for the user and the user authentication enrollment information, wherein providing the request to enroll in SPK authentication is further based on performing the device binding.

6. The system of claim 1, wherein the identity broker system is further configured to:

subsequent to generating the subject identifier for the user and based on receiving a third identification request from the back-end application system, determine whether the user is enrolled in the subject identifier authentication based on performing the identity verification, and wherein providing the request to enroll in the SPK authentication is based on receiving the third identification request.

7. The system of claim 6, wherein the identity broker system is configured to determine whether the user is enrolled in the subject identifier authentication based on performing the identity verification and the third identification request by:

comparing user information from the third identification request with stored user information within a wallet system;

retrieving user authentication enrollment information that is linked to the stored user information within the wallet system;

receiving authentication information from the first user device; and comparing the authentication information with the user authentication enrollment information to determine that the user is enrolled in the subject identifier authentication.

8. The system of claim 7, wherein the user authentication enrollment information is further linked to the generated subject identifier within the wallet system, and wherein the identity broker system is configured to generate the SPK for the user by:

retrieving the generated subject identifier that is linked to the user authentication enrollment information based on the comparison of the authentication information with the user authentication enrollment information; and generating the SPK for the user using the subject identifier fragment from the retrieved subject identifier.

9. The system of claim 1, wherein the identity broker system is further configured to:

generate a subject identifier document associated with the subject identifier, wherein the subject identifier resolves to a storage location for the subject identifier document;

generate a public and private key pair for the user, wherein a public key of the public and private key pair is included within the subject identifier document; and based on receiving the user input from the first user device indicating the approval to enroll in the SPK authentication, generate a pseudorandom function family (PRF) code based on the public key from the subject identifier document, wherein the password manager system is configured to grant access to the first user device to the content on the domain based on the PRF code.

10. The system of claim 9, wherein the password manager system is further configured to:

receive the SPK and the PRF code from the identity broker system;

store the SPK and the PRF code in a wallet system;

provide a SPK authentication request to the first user device, wherein the SPK authentication request indicates a request to sign a challenge using the PRF code; and receive, from the first user device, the signed challenge that was signed by the first user device using the PRF code, wherein granting the access to the first user device to the content on the domain is based on the signed challenge and comparing the stored PRF code in the wallet system with the received SPK from the first user device.

11. The system of claim 1, wherein the identity broker system is further configured to:

based on determining that the second user device that was used for the second content request is enrolled in the device verification, provide enrollment information indicating the enrollment of the second user device, wherein the first user device and the second user device are a same user device; and wherein the password manager system is further configured to:

receive, from the identity broker system, the enrollment information;

based on the enrollment information, provide a SPK request to the second user device;

receive the SPK from the second user device based on the SPK request; and provide an indication to grant access to the content in response to the second content request based on the received SPK from the second user device.

12. The system of claim 1, wherein the identity broker system is further configured to:

based on determining that the second user device that was used for the second content request is not enrolled in the device verification, provide an identity verification request to the second user device;

receive authentication information from the second user device based on the identity verification request;

compare the authentication information with user authentication enrollment information stored in a wallet system, wherein the user authentication enrollment information is linked to the generated subject identifier;

based on the comparison, link device information for the second user device that was used for the second content request with the generated subject identifier; and provide, to the password manager system, information indicating the linking of the device information with the generated subject identifier, wherein the password manager system grants access to the content in response to the second content request based on the information indicating the linking.

13. A method, comprising:

based on a content request for content from a user device associated with a user and a determination that the user is not enrolled in subject identifier authentication, generating a subject identifier for the user, wherein the subject identifier comprises a plurality of elements, wherein at least one of the plurality of elements comprises a subject identifier fragment indicating a unique identifier string for the user, wherein the content request is associated with a first identification request;

based on receiving a second identification request from a back-end application system, determine whether the user is enrolled in the subject identifier authentication based on performing identity verification;

based on generating the subject identifier for the user and the second identification request, providing, to the user device, a request to enroll in secure pass key (SPK) authentication;

based on receiving user input indicating approval to enroll in the SPK authentication, generating a SPK for the user based on the subject identifier fragment from the subject identifier; and providing the SPK to the user device, wherein the user device accesses the requested content based on using the SPK.

14. The method of claim 13, wherein the subject identifier is a decentralized identifier (DID), wherein the plurality of elements of the DID comprise a scheme element, a DID method element, and a namespace specific string, wherein a portion of the namespace specific string indicates the subject identifier fragment, and wherein generating the SPK for the user comprises:

generating the SPK such that the subject identifier fragment indicated by the portion of the namespace specific string of the DID is the SPK.

15. The method of claim 13, further comprising:

subsequent to generating the subject identifier for the user, providing, to the user device, an identity request for use in identity binding;

receiving, from the user device, user authentication enrollment information indicating one or more biometric features of the user; and performing the identity binding for the user by binding the user authentication enrollment information with the generated subject identifier for the user, wherein providing the request to enroll in SPK authentication is based on performing the identity binding.

16. The method of claim 15, further comprising:

providing, to the user device, a device request for use in device binding;

receiving, from the user device, device information associated with the user device; and performing the device binding for the user device by binding the device information with the generated subject identifier for the user and the user authentication enrollment information, wherein providing the request to enroll in SPK authentication is further based on performing the device binding.

17. The method of claim 13, further comprising:

generating a subject identifier document associated with the subject identifier, wherein the subject identifier resolves to a storage location for the subject identifier document;

generating a public and private key pair for the user, wherein a public key of the public and private key pair is included within the subject identifier document; and based on receiving the user input from the user device indicating the approval to enroll in the SPK authentication, generating a pseudorandom function family (PRF) code based on the public key from the subject identifier document, wherein the user device accesses the requested content based on using the SPK and the PRF code.

18. A non-transitory computer-readable medium having processor-executable instructions stored thereon, wherein the processor-executable instructions, when executed, facilitate:

based on a content request for content from a user device associated with a user, generating a subject identifier for the user, wherein the subject identifier comprises a plurality of elements, wherein at least one of the plurality of elements comprises a subject identifier fragment indicating a unique identifier string for the user;

generating a subject identifier document associated with the subject identifier, wherein the subject identifier resolves to a storage location for the subject identifier document;

generating a public and private key pair for the user, wherein a public key of the public and private key pair is included within the subject identifier document;

based on generating the subject identifier for the user, providing, to the user device, a request to enroll in secure pass key (SPK) authentication;

based on receiving user input indicating approval to enroll in the SPK authentication, generating a SPK for the user based on the subject identifier fragment from the subject identifier and a pseudorandom function family (PRF) code based on the public key from the subject identifier document; and providing the SPK to the user device, wherein the user device accesses the requested content based on using the SPK and the PRF code.

19. The non-transitory computer-readable medium of claim 18, wherein the subject identifier is a decentralized identifier (DID), wherein the plurality of elements of the DID comprise a scheme element, a DID method element, and a namespace specific string, wherein a portion of the namespace specific string indicates the subject identifier fragment, and wherein generating the SPK for the user comprises:

generating the SPK such that the subject identifier fragment indicated by the portion of the namespace specific string of the DID is the SPK.

20. The non-transitory computer-readable medium of claim 18, wherein the processor-executable instructions, when executed, further facilitate:

subsequent to generating the subject identifier for the user, providing, to the user device, an identity request for use in identity binding;

receiving, from the user device, user authentication enrollment information indicating one or more biometric features of the user; and performing the identity binding for the user by binding the user authentication enrollment information with the generated subject identifier for the user, wherein providing the request to enroll in SPK authentication is based on performing the identity binding.

* * * * *